United States Patent
Coffee et al.

(10) Patent No.: US 9,094,419 B2
(45) Date of Patent: Jul. 28, 2015

(54) REAL-TIME FACSIMILE TRANSMISSION OVER A PACKET NETWORK

(75) Inventors: Michael B. Coffee, Alpharetta, GA (US); Clifford J. Schornak, Marietta, GA (US)

(73) Assignee: Netgen Communications, Inc., Roswell, GA (US)

( * ) Notice: Subject to any disclaimer, the term of this patent is extended or adjusted under 35 U.S.C. 154(b) by 1099 days.

(21) Appl. No.: 12/943,297

(22) Filed: Nov. 10, 2010

(65) Prior Publication Data
US 2011/0109936 A1    May 12, 2011

Related U.S. Application Data

(60) Provisional application No. 61/259,766, filed on Nov. 10, 2009.

(51) Int. Cl.
*G06F 15/00* (2006.01)
*H04L 29/06* (2006.01)
*H04N 1/00* (2006.01)

(52) U.S. Cl.
CPC .......... *H04L 65/1069* (2013.01); *H04L 65/103* (2013.01); *H04L 65/40* (2013.01); *H04N 1/0022* (2013.01); *H04N 1/00214* (2013.01); *H04N 2201/0015* (2013.01); *H04N 2201/0024* (2013.01)

(58) Field of Classification Search
CPC ... H04L 65/103; H04L 65/1069; H04L 65/40; H04N 1/00214; H04N 1/0022
See application file for complete search history.

(56) References Cited

U.S. PATENT DOCUMENTS

| | | | | |
|---|---|---|---|---|
| 5,287,180 | A * | 2/1994 | White | 348/484 |
| 6,038,037 | A * | 3/2000 | Leung et al. | 358/434 |
| 6,327,276 | B1 * | 12/2001 | Robert et al. | 370/535 |
| 6,504,838 | B1 * | 1/2003 | Kwan | 370/352 |
| 6,690,746 | B1 * | 2/2004 | Sills et al. | 375/316 |
| 6,801,341 | B1 * | 10/2004 | Joffe et al. | 358/407 |
| 2003/0123097 | A1 * | 7/2003 | Fruth | 358/400 |
| 2005/0088975 | A1 * | 4/2005 | Wildfeuer et al. | 370/235 |
| 2005/0117594 | A1 * | 6/2005 | Ryan | 370/401 |
| 2010/0079784 | A1 * | 4/2010 | Jackson et al. | 358/1.14 |

OTHER PUBLICATIONS

Sisalem, Dorgham, et al., "Understanding SIP", Mobile Integrated SErvices, GMD Fokus, Sep. 2002.
Johnston, Alan B. and Sinnreich, Henry, "Introduction to SIP", The Premier IP Communications Conference, Boston, MA Oct. 29-Nov. 1, 2007.
Rosenberg, J., "Hitchhiker's Guide to the Session Initiation Protocol (SIP)," Network Working Group, CISCO, located at http://www.ietf.org/rfc/rfc5411.txt, Jan. 2009.

* cited by examiner

*Primary Examiner* — Charles C Jiang
*Assistant Examiner* — Thad Defauw
(74) *Attorney, Agent, or Firm* — Thomas | Horstemeyer, LLP

(57) ABSTRACT

Various methods and systems are provided for real-time facsimile (fax) transmission over a packet network. In one embodiment, among others, a method includes monitoring fax communications across a pass-through connection and controlling transfer of the fax communications to a fax-relay protocol connection based at least in part upon the monitored fax communications. In another embodiment, a method includes monitoring a state of a state machine communicating over a pass-through connection and, responsive to a re-invite to the fax-relay protocol, transferring from the pass-through connection to a fax-relay protocol connection based at least in part upon the state of the state machine.

43 Claims, 9 Drawing Sheets

REAL-TIME FACSIMILE TRANSMISSION OVER A PACKET NETWORK

CROSS REFERENCE TO RELATED APPLICATIONS

This application claims priority to U.S. provisional application entitled "Interlocking T.38 Re-invite Acceptance in SIP to T.30 State" having Ser. No. 61/259,766, filed Nov. 10, 2009, the entirety of which is hereby incorporated by reference.

BACKGROUND

Even with the advent of e-mail, facsimile (fax) remains an important and ubiquitous form of business communications. Virtually all businesses use fax; with some, it is critical to the business's mission. Some large multi-location enterprises send thousands of faxes every day between offices, spending tens-of-thousands of dollars every year on telephone toll charges.

The use of the Internet as an application platform for real-time media transport has disintermediated telecommunications. Users can transport voice calls across the Internet without the involvement of telephone companies. One of the earliest such services was that of Net2Phone®, which offered PC-to-PC communications for a fee paid to the company, not unlike a telephone company, but much less expensive.

Other services (e.g., Skype™) offer peer-to-peer (P2P) communication service over the Internet at no fee. The Skype™ P2P technology is characterized by a method of traversing firewalls and handling Network Address Translation (NAT) to allow Internet packets to flow in real time between the two correspondent Skype™ clients. Although there are other P2P networks, such as Napster™, File-Sharing, Collaboration, Freenet, and Gnutella, these networks are based on open-source software and are intended for data-file exchange, not real-time media data transfer, such as that required for a voice or a fax call.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
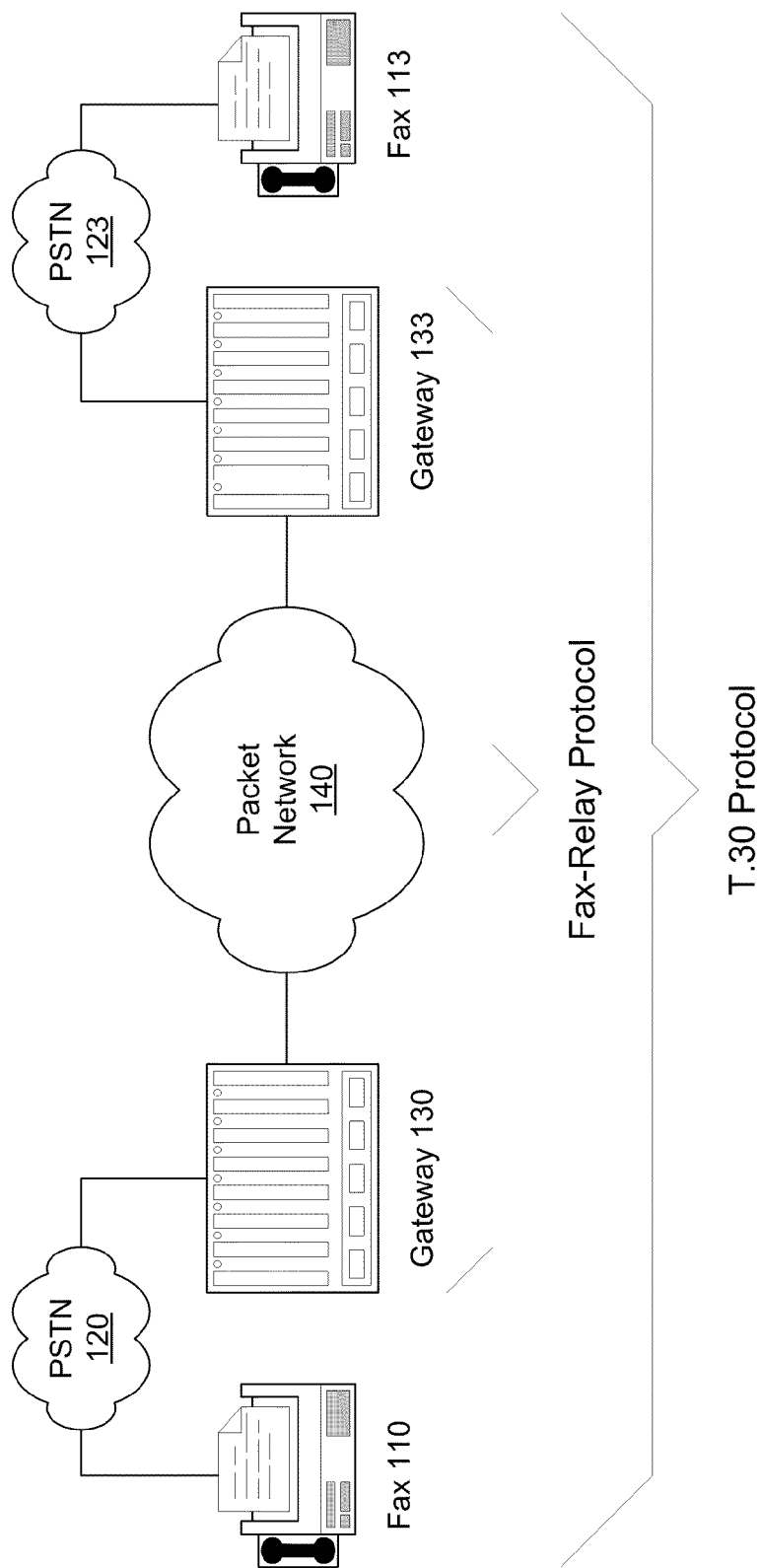
FIG. 1 is a diagram of a network that allows an endpoint fax terminals to use ITU T.30 fax protocol for communications via a packet-based data network according to various embodiments of the present disclosure.

Disclosed herein are various embodiments of methods related to facsimile (fax) communications over packet-based data networks. Reference will now be made in detail to the description of the embodiments as illustrated in the drawings, wherein like reference numbers indicate like parts throughout the several views.

The International Telecommunications Union (ITU) T.30 standard was initially established for communications over the voice-based public switched telephone networks utilizing time-division multiplexed (TDM) systems. As the global telephony network transitions from TDM systems to Internet Protocol (IP) networks for the transport of voice calls, referred to as voice-over-IP (VoIP), the demand for the effective transport of real-time facsimile (fax) over IP networks (FoIP) is growing. The International Telecommunications Union (ITU) standard T.38 for FoIP, introduced in 1998, is now widely deployed within many business enterprise networks. But as businesses begin to expand the boundaries of their utilization of IP networks to include their service providers through direct IP peering connections, demand is increasing for effective IP-fax transport beyond the borders of the enterprise network to eliminate the need to maintain separate public switched telephone network (PSTN) lines for existing fax terminals and servers.

Referring to FIG. 1, shown is a diagram of a network that allows an endpoint fax terminal 110 to use the ITU T.30 standard G3 fax protocol for communications over the voice-based PSTN 120 via a gateway 130 in combination with a packet-based data network 140, such as the Internet and/or an enterprise network, to another endpoint fax terminal 113 via gateway 133 and PSTN 123. The endpoint fax terminals 110 and 113 communicate using the T.30 protocol, which is typically implemented in the fax terminals as a "state machine." The state machine transitions between states based upon detected events. For example, the state machine remains in an "idle" state prior to anything happening. The state machine anticipates any of several events, each of which will cause the state machine to perform one or more specific actions while transitioning to a new state. The action(s) and the new state depend upon the current state and the detected event. Ultimately, the state machine will transition back to the idle state, e.g., after a fax has been sent or received. Telephony engineers refer to this type of entity as being "stateful".

PSTN-IP gateways 130 and 133 support TDM voice and fax on the PSTN side and VoIP and FoIP on the packet-network side. A fax-relay subsystem allows endpoint fax terminals, fax equipment equipped with an analog telephone adapter (ATA), and/or fax servers to use the ITU T.30 standard G3 (or G4) fax protocol for communications over the packet network 140, even though the T.30 standard was only intended by its developers for use over a PSTN using time-division multiplexed (TDM) transport. The fax-relay subsystem serves to render the interposing packet network 140, as well as the fax-relay protocol utilized for packet transfer between gateways 130 and 133, transparent to the endpoint T.30 terminals 110 and 113. Examples of industry-standard fax-relay protocols that can be employed in connection with the fax-relay subsystem include, but are not limited to, the ITU T.38, the Frame Relay Forum FRF.11.1, and the ITU 1.366.2 for ATM networks. These and other industry-standard fax-relay protocols utilize full access to the network's transport mechanism to allow for transmission of a fax across a packet network in real time, just as the original G3 fax standards did for the traditional TDM PSTN. While a T.30 endpoint fax terminal is "stateful," fax-relay subsystems are typically "stateless" as far as the overall transaction is concerned.

Figure 2:
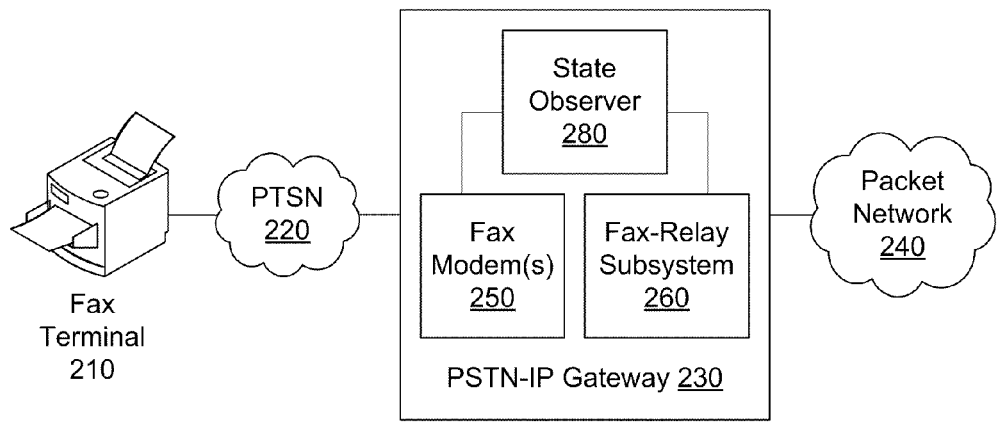
FIG. 2 is a diagram of a PSTN-IP gateway used in fax protocol communications via the packet-based data network of FIG. 1 according to various embodiments of the present disclosure.

Referring now to FIG. 2, a PSTN-IP gateway 230 includes two elements: one or more fax modems 250 and a fax-relay subsystem 260 (e.g., a T.38 subsystem). The fax modems 250 modulate and demodulate pulse-code modulation (PCM) samples of analog data received through PSTN 220, turning the sampled-data representation of the analog signal of the fax terminal 210 into its binary translation for transmission over the packet network 240, and vice versa. For example, a fax modem 250 samples the analog signal of a voice or modem signal 8,000 times per second (SPS) and encodes the samples as 8-bit data bytes, resulting in 64,000 bits per second (bps) of data to represent the fax (or voice) data in one direction. For both directions, the modem transaction consumes 128,000 bits pre second of network bandwidth. This mode of transmission is commonly called G.711 pass-through or simply G.711, which is another ITU standard. It should be noted that G.711 pass-through does not distinguish between a voice call and a fax call, except for matters relating to so-called jitter buffers and packet-loss concealment, essentially treating both as a VoIP call encoded as audio. While the human ear is able to compensate for missing or delayed packets, facsimile data is transmitted by modems 250 that are not as forgiving. For example, missing data packets can often cause a fax session to fail or create one or more image line errors.

In addition, PCM clock synchronization problems can occur when a fax call is handled as if it were a voice call. A sample-rate clock in the fax modem 250 is used to trigger the sampling of the analog data received through PSTN 220 from the fax terminal 210 at 8,000 SPS. On the far side of the packet network 240, arriving packets are metered out by a PCM clock in a receiving PSTN-IP gateway. The PCM clocks are usually quite accurate, but in some terminal adapters (e.g., a one or two-line gateway) the PCM clock may be surprisingly inaccurate resulting in synchronization problems. For example, with reference to FIG. 1, if fax terminal 110 is sending data to gateway 130 and the gateway's clock is too slow, jitter buffers in the gateway 130 may overflow or the jitter buffer in gateway 133 on the opposite side of the packet network 140 may eventually underflow, both of which can cause lose of data and a potential session failure. Since the PCM clock difference is often quite small, this problem usually occurs during transmission of long, detailed fax images, which allow more time for the jitter buffers in the gateways 130 and 133 to either underflow or overflow, resulting in a failed session.

Referring back to FIG. 2, fax-relay protocols (e.g., T.38) support the use of the T.30 protocol in both the transmitting and receiving endpoint terminals while transmitting a fax across a packet network in real time. In some embodiments, fax-relay protocols, which are implemented by the fax-relay subsystem 260, correct for network delays using spoofing techniques and adjust for missing or delayed packets with fax-aware buffer-management techniques. Spoofing modifies the protocol commands and responses on the PSTN 220 side of the gateway 230 to keep network delays on the packet network 240 side from causing the transaction to fail. This may be accomplished, for example, by padding image lines or deliberately causing a message to be re-transmitted to render network delays transparent to the sending/receiving fax terminals. The fax-relay protocol effectively removes the requirement that all the PCM clocks in the network be synchronized because the PCM data are demodulated by the transmitting (or on-ramp) gateway and remodulated by the receiving (or off-ramp) gateway. Spoofing techniques provide the needed "slip-joint" in the middle. Fax-relay protocols may also provide facilities to eliminate the effects of packet loss through data redundancy. When a data packet is sent, one or more of the previously sent packets may be repeated. The T.38 fax-relay protocol, for example, does not impose a limit on repeated packets. While this repetition increases the network bandwidth required, the bandwidth is still much less than when not using the T.38 protocol. The repetition allows the receiving (or off-ramp) gateway to reconstruct the complete packet sequence, even when a fairly high level of packet loss is present.

Figure 3:
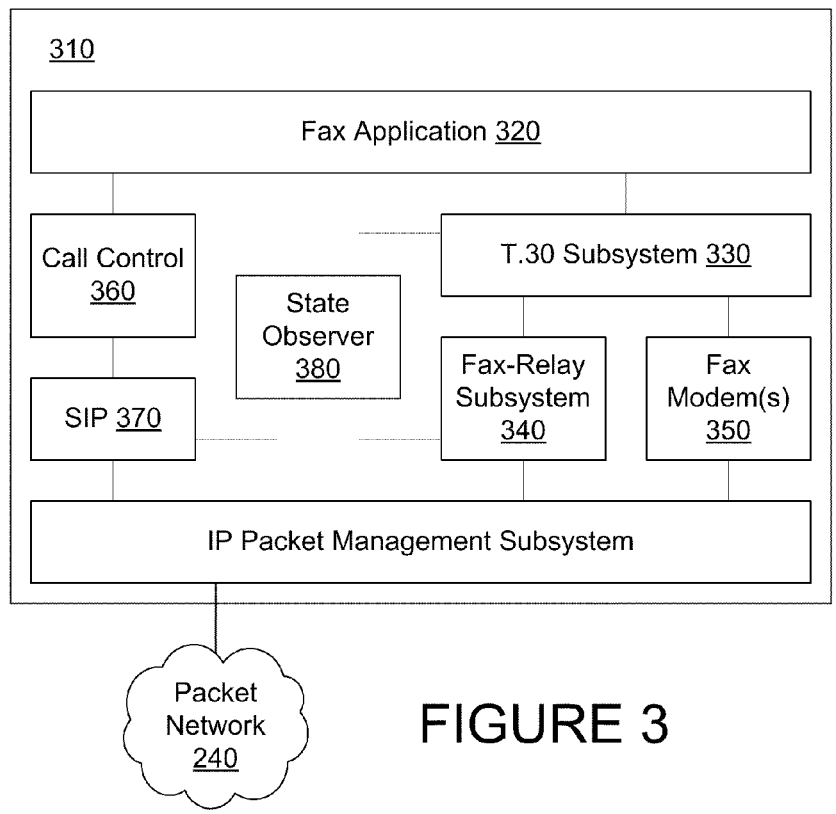
FIG. 3 is a diagram of an IP-based fax server used in fax protocol communications via the packet-based data network of FIG. 1 according to various embodiments of the present disclosure.

However, without the spoofing techniques of the fax-relay protocol, other techniques are needed when in G.711 pass-through mode. The jitter buffers in the gateway 130 may overflow or the jitter buffer in gateway 133 on the opposite side of the packet network 140 may eventually underflow, both of which can cause lose of data and a potential session failure. The G.711 pass-through data streams include packet transmissions separated by silent periods on the pass-through connection. In some cases, the silence can last for more than a second. An indicator may be provided to reset the jitter buffers during silence that are sufficiently long to not interrupt the fax data transfer. For example, a modem (e.g., a V.21 modem) may be attached to the G.711 pass-through connection to monitor the data stream. Packets are examined to determine if they include a V.21 frame that is not a digital command signal (DCS). If a packet meets this condition, then the subsequent silence on the pass-through connection is sufficient to allow resetting of the jitter buffer. An indicator may be provided based upon the determination to reset the jitter buffer. Resetting of the jitter buffers reduces the likelihood of overflow or underflow of the buffers. The jitter buffer reset may be implemented on a PSTN-IP gateway 230 (FIG. 2) and/or an IP-based fax server 310 (FIG. 3).

IP telephony signaling standards such as, but not limited to, Session Initiation Protocol (SIP) or H.323 can be used to transition an IP-based fax session between gateways 130 and 133 (FIG. 1) from a G.711 pass-through fax protocol to a T.38 (or other) fax-relay protocol. This means that direct IP interconnection (or peering) between an enterprise, or any subscriber, and the IP-telephony service provider (ITSP) is governed by the SIP or H.323 signaling protocol. However, if the state of the T.30 protocol is not maintained in the endpoint terminals 110 and 113 throughout the transition, the transaction fails. This can result in completion rates of fax calls between fax terminals equipped with a T.38 adapter (analog telephone adapter or ATA) that are often 10 to 20 percent less than those made over the PSTN.

By interlocking and synchronizing the termination of the initial G.711 pass-through phase of a fax session with the switchover to and initiation of the fax-relay protocol (e.g., T.38) phase of the session, the endpoint terminals are allowed to maintain and continue their on-going exchange of image data between the terminals and/or fax servers using the ITU T.30 protocol, thereby properly completing the exchange of the facsimile data and completion of the session. This interlocking and synchronization may be accomplished by monitoring the state of the endpoint terminal 210 based upon the G.711 fax messages and/or data being sent through the PSTN-IP gateway 230 and transitioning between phases based upon the monitored state. The fax state of the endpoint terminal 210 may be monitored by a state observer 280 within gateway 230, which monitors the communications of the endpoint terminal 210 and the communications of the endpoint terminal at the opposite end. The state observer 280 may then provide outputs for the gateway 230 to interpret and act upon.

In some embodiments, an IP-based fax server 310 (FIG. 3) may replace the fax endpoint terminal 210 and PSTN-IP gateway 230 of FIG. 2. Referring to FIG. 3, the IP-based fax server 310 is connected directly to the packet network 240 and includes a fax application 320 to provide endpoint terminal/fax server functionality. As a physical endpoint fax terminal does not exist in the fax server 310, a virtual endpoint fax terminal provides a functional equivalent of the physical endpoint fax terminal. The virtual endpoint fax terminal includes the fax application 320 and a T.30 protocol subsystem 330. Since the endpoint T.30 protocol subsystem 330 and the fax-relay subsystem 340 are part of the same server 310, fax modems are not required for them to communicate. In some embodiments, one or more fax modems 350 may also be included within the fax server 310 to provide the functionality to terminate fax transactions that do not use a fax relay protocol, such as T.38. In addition, the virtual endpoint fax terminal may include other elements such as the call control entity 360. The fax server 310 also includes a signaling entity 370 (e.g., SIP or H.323).

As illustrated in FIG. 3, an IP packet management subsystem provides an interface between the fax-relay subsystem 340 and/or fax modems 350 and the packet network 240. Interlocking and synchronization of the termination of the initial G.711 pass-through phase of a fax session with the switchover to and initiation of the fax-relay protocol phase of the session may be accomplished by a state observer 380 monitoring the state of the virtual endpoint fax terminal based at least in part upon indications of the state of the signaling entity 370 call set up in the fax server 310 and the state of the T.30 subsystem 330. The state observer 380 may then provide outputs for the signaling entity 370 to interpret and act upon.

Figure 4:
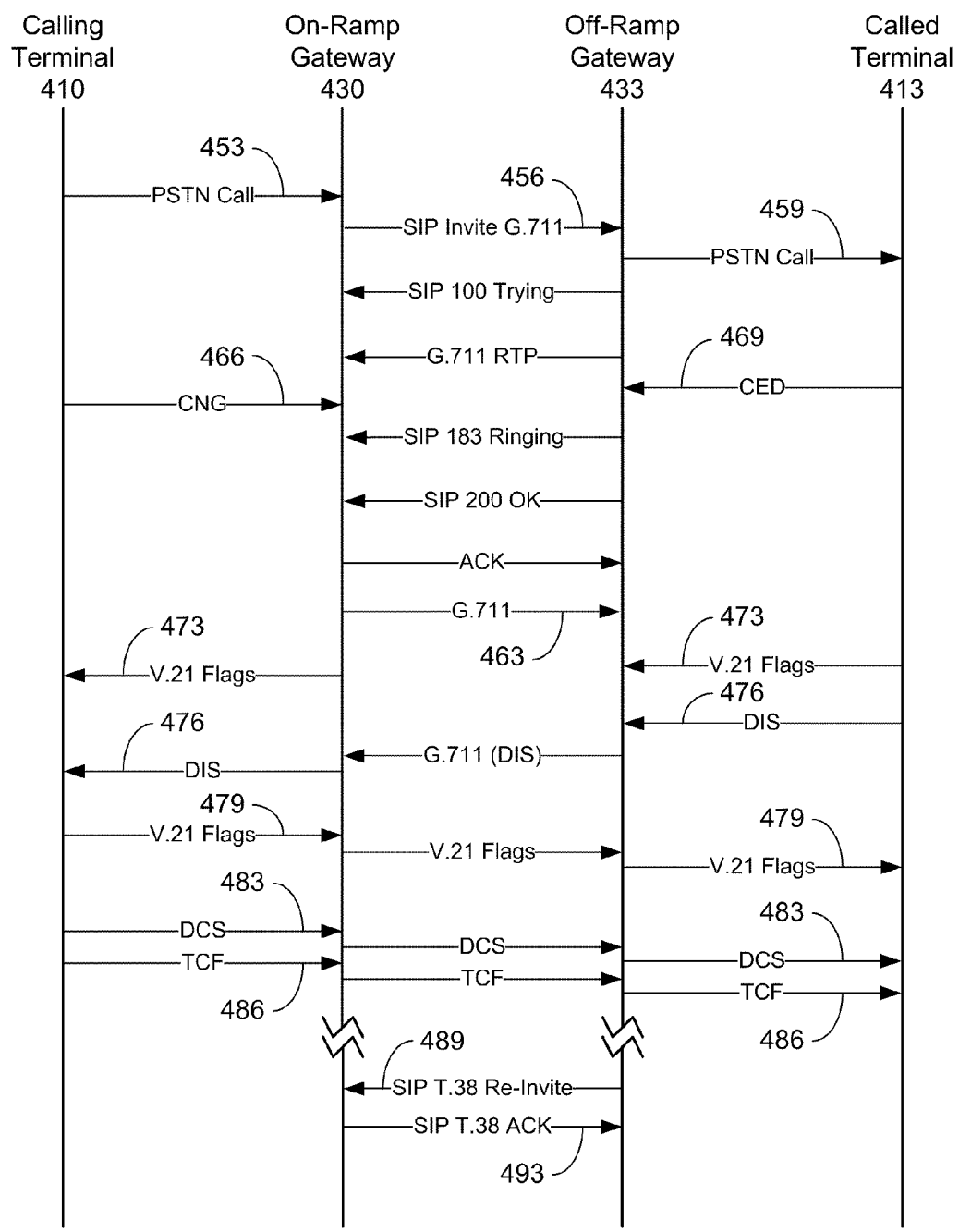
FIG. 4 is a message diagram, commonly called a ladder diagram, illustrating the establishment of fax communications between endpoint terminals over the packet-based data network of FIG. 1 according to various embodiments of the present disclosure.

Referring next to FIG. 4, shown is a messaging diagram illustrating the establishment of fax communications between an initiating or calling endpoint terminal 410 and a receiving or called endpoint terminal 413 over a packet network (e.g., packet network 140 of FIG. 1). The gateway that is connected to the calling fax terminal 410 (e.g., endpoint fax terminal 110 of FIG. 1) is referred to as the sending or on-ramp gateway 430 (e.g., gateway 130 of FIG. 1). The gateway that is connected to the called fax terminal 413 (e.g., endpoint fax terminal 113 of FIG. 1) is referred to as the receiving or off-ramp gateway 433 (e.g., gateway 133 of FIG. 1). In this exemplary sequence, the endpoint terminals 410 and 413 communicate using the T.30 protocol. In SIP-based networks for non-V.34 operation, the off-ramp gateway 433 is responsible for determining that the called terminal 413 is a fax terminal, rather than voice or data-modem terminal, and initiating a SIP re-invite from a G.711 pass-through mode to a T.38 mode to the on-ramp gateway 430 based upon the determination. It is then the responsibility of the on-ramp gateway 430 to decide whether to accept the re-invite and transition to the T.38 mode or whether to continue in the G.711 pass-through mode.

To begin, under the T.30 protocol the calling terminal 410 initiates the communication by placing a PSTN Call 453 to the on-ramp gateway 430. In response, the on-ramp gateway 430 sends a SIP Invite message 456 to establish G.711 pass-through between the on-ramp gateway 430 and the off-ramp gateway 433. A PSTN Call 459 is placed from the off-ramp gateway 433 to the called terminal 413 as a result of the SIP Invite message 456. The off-ramp gateway 433 also responds to the SIP Invite message 456 by sending a series of messages resulting in a G.711 pass-through 463 between the on-ramp and off-ramp gateways 430 and 433. The calling and called terminals also begin emitting the fax calling tone (CNG) 466 and fax answering tone (CED) 469, respectively. CNG 466 is a half-second on, 2100-Hz tone with a 3-second cycle, sent by the calling fax terminal 410 to inform the called terminal 413 that the calling terminal 410 is, indeed, a fax terminal. One of its highest-value uses of CNG is to inform unified-messaging (UM) systems, which also receive voice calls, that the inbound call is a fax call and the UM system must switch from voice to fax mode. However, once the called terminal 413 accepts the call and emits either CED 469 or V.21 flags 473, CNG 466 no longer has any value. Indeed, it can cause harm since it can interfere with the detection of V.21 flags 473 from the called terminal 413 by the off-ramp gateway 433. There is benefit, therefore, in the on-ramp gateway 430 not sending CNG 466, either as a G.711 media stream or as a T.38 message, once the called terminal 413 has emitted either CED 469 or V.21 flags 473, confirming that it is a fax terminal.

Once the CNG 466 and CED 469 are recognized through the G.711 pass-through connection, the called terminal 413 begins a negotiation phase of the fax session by sending V.21 flags 473 and a digital identification signal (DIS) message 476 indicating the capabilities of the called terminal 413 to the calling terminal 410. The calling terminal 410 enters the negotiation phase by responding with V.21 flags 479 that are relayed to the called terminal 413, followed by a digital command signal (DCS) message 483 indicating the transmission mode that will be used by the calling terminal 410 and a training check sequence (TCF) 486. A confirmation-to-receive (CFR) message is then be sent indicating that the called terminal 413 is ready to receive the fax image and the calling terminal 410 begins transmitting the fax image data over the G.711 pass-through connection.

Generally, the off-ramp gateway 433 sends a SIP T.38 re-invite message when the V.21 flags 473 are detected after the G.711 pass-through connection has been established. If the SIP T.38 re-invite message is sent and the on-ramp gateway 430 responds with a SIP T.38 ACK message before the DCS message 483 is sent by the calling terminal 410, a T.38 fax-relay protocol connection may be established through the packet network for transmission of the fax image data. However, the SIP T.38 re-invite message 489 may be delayed, as illustrated in FIG. 4, especially when multiple tandem IP networks are involved. Accordingly, the SIP T.38 ACK message 493 is sent after the DCS message 483 establishing the transmission mode of the calling terminal 410. Upon accepting a T.38 re-invite 489, most on-ramp gateways 430 will immediately disconnect the G.711 pass through media streams and connect the PSTN line to the modems in the gateway. These modems will require time to synchronize and begin decoding data and retransmitting it. As a result, the endpoint modems in the two terminals 410 and 413 will lose signal lock and the current message will be lost. It has been noted that if a SIP T.38 re-invite message 489 is not sent within six seconds of establishing the G.711 pass-through phase, it is highly likely that the fax transmission will fail.

As currently practiced, a gateway 130 and/or 133 (FIG. 1) operating in G.711 pass-through does not monitor the messaging and/or fax data that are being sent through the G.711 pass-through connection and, therefore, does not know the current state of the attached endpoint fax terminals 110 and 113, respectively. This lack of endpoint terminal status prevents the gateway 130 from making an informed decision regarding whether it should accept a re-invite to T.38. Rather, as discussed previously, most gateways 130/133 simply accept the T.38 re-invite based on the assumption that the re-invite to T.38 will occur prior to both of the T.30 endpoint terminals entering the negotiation phase of the fax session. Transmission of the DCS message 483 begins establishment of the synchronization of the endpoint fax terminals 130 and 133. However, if one of the gateways 130/133 interrupts the synchronization of the endpoint fax terminals 130/133, e.g., by a subsequent acceptance of a SIP T.38 re-invite message as illustrated in FIG. 4, the endpoint fax terminals 130/133 can lose synchronization, which results in a failed session.

As was pointed out before, failure of the fax session may be reduced or eliminated by interlocking and synchronizing the termination of the initial G.711 pass-through phase of a fax session with the switchover to and initiation of the fax-relay protocol phase of the session. Whether to accept or reject a T.38 re-invite may be based upon the state of the endpoint fax terminals and/or the fax servers. Monitoring the state of an endpoint fax terminal by a gateway or the state of a fax application by a fax server allows for such a transition determination without affecting the operation of the endpoint fax terminal or the fax application. The state monitoring may be implemented as a state observer 280/380 in the PSTN-IP gateway 230 (FIG. 2) or the fax media server 310 (FIG. 3). For example, if the responsibility for accepting or rejecting T.38 re-invites rests with the on-ramp gateway, the state observer 280 is implemented on the on-ramp gateway. In other embodiments, the state observer 280 may be implemented on the off-ramp gateway. In some embodiments, the state observer 380 may be implemented as part of the T.30 subsystem 330 of a fax server 310 or separately in the fax server 310.

With respect to FIG. 4, after the calling endpoint terminal 410 initiates a call, the on-ramp gateway 430 and/or the off-ramp gateway 433 may attach a V.21 modem to both G.711 call streams passing through the on-ramp gateway 430 to and from the off-ramp gateway 433 and the called endpoint terminal 413. The on-ramp gateway 430 analyzes the decoded V.21 messages to track the state of the calling endpoint fax terminal 410 and/or the called endpoint fax terminal 413. The called terminal 413 will repeatedly send its digital identification signal (DIS) message 476 until the calling terminal 410 sends its response. Once the calling terminal 410 receives a complete DIS, the calling terminal 410 generally begins sending its V.21 response messages within 75 milliseconds. Therefore, once the digital command signal (DCS) message 483 is received by the called terminal 413, uninterruptable modem operations have begun, and the gateways 430/433 can no longer switch the session to T.38 without possible corruption of the modem signals and the T.30 states being maintained in the endpoint terminals 410/413. Once the on-ramp gateway 430 and/or the off-ramp gateway 433 detects the V.21 preamble 479 of the calling fax terminal's response, the on-ramp gateway 430 will no longer accept the T.38 re-invite or the off-ramp gateway 433 will no longer send the T.38 re-invite, continuing the fax session in G.711 pass-through and avoiding the session failures caused by a subsequent transition.

In the case of an IP-based fax server 310 (FIG. 3), the state observer 380 need not utilize a modem to track the state of the T.30 session, rather, it can directly query the T.30 session to determine its state and decide whether to issue or accept a re-invite. Alternatively, the state observer 380 may be implemented separately from the T.30 subsystem 330 with modems or may be implemented as part of the T.30 subsystem. In some embodiments, the state observer 380 may use information from the T.30 state machine. For example, the fax server 310 may accept T.38 re-invites up to the point where the T.30 subsystem 330 has received the DIS 476 of the called terminal 413 and refuse all subsequent T.38 re-invites without causing the fax session to fail. In other embodiments, the state observer 380 monitors fax communications on the pass-through connection. For example, a V.21 modem may be used by the state observer 380 to monitor the fax communications through the fax server 310.

Figure 5:
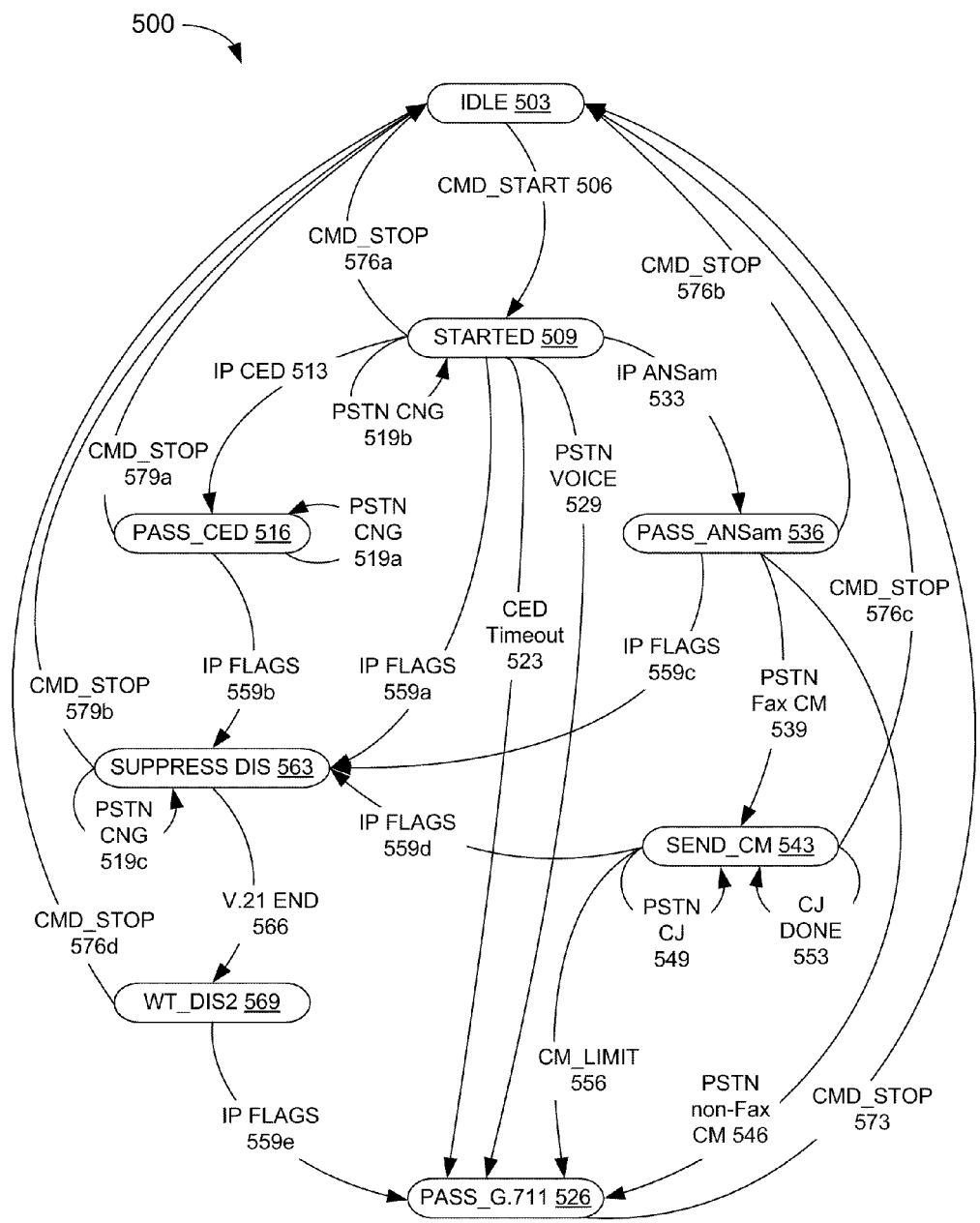
FIGS. 5 and 6 are state diagrams illustrating examples of monitoring by a state observer on an on-ramp gateway of FIG. 4 according to various embodiments of the present disclosure.

Referring now to FIG. 5, shown is a state diagram 500 illustrating an example of monitoring by a state observer 280/380 on an on-ramp gateway when V.34 fax operation is not supported. The on-ramp gateway allows V.8 messaging to pass from the called terminal to the calling terminal, but if the calling terminal responds with a fax call menu (CM), then the call menu is adjusted to remove V.34 capability. While the embodiment of FIG. 5 is discussed in terms of the endpoint fax terminals and gateways of FIG. 4, the state monitoring is equally applicable to a state observer 380 on a server 310 (FIG. 3). Initially, the state observer 280/380 is in an idle state 503 corresponding to the calling terminal being idle. When a call is initiated by the calling terminal (e.g., by calling terminal 410 making a PSTN Call message 453 in FIG. 4), a start command 506 transitions the state observer 280/380 to a started state 509 corresponding to the calling terminal starting a calling session. In the started state 509, the on-ramp gateway 430 can accept a T.38 re-invite as the endpoint fax terminals 410/413 have not entered the negotiation phase of the fax session.

In the started state 509, the state observer 280/380 monitors the PSTN-IP and IP-PSTN data streams through the gateway. The monitoring may be accomplished using V.8 calling and called modems along with various tone and voice detectors. In some embodiments, a V.21 modem is attached to monitor the signaling messages sent across the G.711 pass-through. If the state observer 280/380 detects a V.8bis signal indicating that the answering terminal is a data modem, the state observer 280/380 transitions to the G.711 pass-through mode to support transparent modem operation. If the state observer 280/380 detects a fax answering tone (CED) 513 transmitted across the packet network, then the state observer 280/380 transitions to a state 516 where the CED is allowed to pass through unmodified. The pass CED state 516 corresponds to the calling terminal 410 having received the CED from the called terminal 413. When in this state 516, the on-ramp gateway 430 expects a T.38 re-invite to be sent by the off-ramp gateway 433. If a fax calling tone (CNG) 519*a* is detected in the pass CED state 516, it is allowed to pass through unmodified. In the pass CED state 516, the on-ramp gateway 430 can accept a T.38 re-invite as the endpoint fax terminals 410/413 have not entered the negotiation phase of the fax session.

If the state observer 280/380 detects a PSTN CNG 519*b* (e.g., CNG 466 of FIG. 4) when in the started state 509, then a CED timer is initiated. In one embodiment, the CED timer is for three seconds. If a CED 513 is detected, than the CED timer is stopped and the state observer 280/380 transitions as described above. If a CED 513 is not detected and the CED timer times out 523, then the state observer 280/380 transitions to a G.711 pass through state 526 where full-duplex pass through is enabled. A CED timeout 523 indicates that the called device may not support fax sessions. Similarly, if a PSTN voice event 529 is detected, then the CED timer is stopped and the state observer 280/380 state observer 280/380 transitions to the G.711 pass through state 526 where full-duplex pass through is enabled. In the G.711 pass through state 526, the on-ramp gateway 430 no longer accepts T.38 re-invites and may choose to begin normal voice procedures. If V8bis is detected on either the IP or the PSTN, the session may be determined to be a modem session and the state observer 280/380 transitions to the G.711 pass-through state 526.

If the state observer 280/380 detects an IP amplitude modulated answer tone (ANSam) 533 when in the started state 509, then the CED timer is cleared and the state observer 280/380 transitions to a state 536 where the ANSam is allowed to pass through. The pass ANSam state 536 corresponds to the calling terminal 410 having received the ANSam from the called terminal 413. In the pass ANSam state 536, the on-ramp gateway 430 can accept a T.38 re-invite as the endpoint fax terminals 410/413 have not entered the negotiation phase of the fax session. If the state observer 280/380 detects a fax call menu (CM) 539 when in the pass ANSam state 536, then the state observer 280/380 transitions to a send CM state 543 where the CM is modified to remove V.34 capabilities and the modified CM is sent to the called terminal 413. If a non-fax CM 546 is detected in the pass ANSam state 536, then the state observer 280/380 transitions to the G.711 pass through state 526 where full-duplex pass through is enabled and T.38 re-invites are no longer accepted.

In some embodiments, when the end of the ANSam is detected in the pass ANSam state 536, an ANSam timer is started. For example, the ANSam timer may be a 500 millisecond timer. If the ANSam timer times out without detecting, e.g., a fax CM 539, non-fax CM 546, or V.21 flags 559c, then the state observer 280/380 transitions to the G.711 pass through state 526 where full-duplex pass through is enabled and T.38 re-invites are no longer initiated.

When the state observer 280/380 detects the CM terminator (CJ) 549 in the send CM state 543, the CJ is passed through to the called terminal 413. When the CJ is completed 553, a flags timer is started. In one embodiment, the flags timer is set for 500 milliseconds. The send CM state 543 corresponds to the calling terminal 410 having sent the CM. In the send CM state 543, the on-ramp gateway 430 can accept a T.38 re-invite as the endpoint fax terminals 410/413 have not entered the negotiation phase of the fax session. If a CM limit 556 is reached when the flags timer times out without detection of V.21 flags 559d, then the state observer 280/380 transitions to the G.711 pass through state 526 where full-duplex pass through is enabled and T.38 re-invites are no longer accepted.

Upon detection of V.21 flags 559a-559d such as those prior to the digital identification signal (DIS) transmitted across the packet network, the state observer 280/380 transitions from the started state 509, pass CED state 516, pass ANSam state 536, or the send CM state 543 to a suppress DIS state 563 where the preamble is allowed to pass, but the actual high-level data link control (HDLC) frames of the DIS are corrupted or garbled. In the case of a transition from a started state 509 to the suppress DIS state 563, detection of V.21 flags 559a stops the CED timer if running. If an ANSam timer was initiated in the pass ANSam state 536, detection of V.21 flags 559c stops the ANSam timer. Similarly, in the case of a transition from a send CM state 543 to the suppress DIS state 563, detection of V.21 flags 559d stops the flags timer if running.

HDLC corruption can be performed in a number of ways such as, but not limited to, demodulation and re-modulation of the V.21 frames with invalid cyclic redundancy checks (CRCs), releasing buffer packets in reverse order after the preamble, discarding every other PCM buffer and repeating the previous buffer data and/or other appropriate garbling methods. Corruption of the DIS prevents the calling terminal 410 from proceeding in the negotiation phase of the fax session and allowing the on-ramp gateway 430 to accept a T.38 re-invite. When in this state 563, the on-ramp gateway 430 expects a T.38 re-invite to be sent by the off-ramp gateway 433. If a fax calling tone (CNG) 519c is detected in the suppress DIS state 563, it is allowed to pass through unmodified.

Without a response from the calling terminal 410, the called terminal 413 resends the DIS 476 at regular or pre-defined intervals until the calling terminal 410 sends its response or a DIS timeout occurs. For example, the DIS 476 may be resent by the called terminal 413 every 3.5 seconds until the DIS timeout is reached (e.g., up to about 35 seconds) or a response (e.g., digital command signal (DCS) message 483) is sent by the calling terminal 410. If a T-38 re-invite has not been received by the on-ramp gateway 430, corruption of the DIS 476 continues until the end of the first DIS frame.

A V.21 end condition 566 transitions the state observer 280/380 to a second DIS state 569 where the state observer 280/380 waits for the preamble of the second DIS. The wait DIS2 state 569 corresponds to the calling terminal 410 not having received the first DIS from the called terminal 413 because it was garbled and thus not able to response with a DCS to complete the fax negotiation. In the wait DIS2 state 569, the on-ramp gateway 430 may still accept a T.38 re-invite. However, upon detection of V.21 flags 559e, the state observer 280/380 transitions to the G.711 pass through state 526 where full-duplex pass through is enabled and the on-ramp gateway 430 no longer accepts T.38 re-invites. Some implementations may garble more than the first DIS, while others may not garble the DIS at all. Garbling of the DIS allows more time for the T.38 re-invite negotiations to be completed.

When a call is over and the session has been completed in the G.711 pass through state 526, a stop command 573 transitions the state observer 280/380 back to the idle state 503. Stop commands 576a-576d transition the state observer 280/380 from the started state 509, the pass ANSam state 536, the send CM state 543, and the wait DIS2 state 569, respectively, to the idle state when the on-ramp gateway 430 is going to V.34 under T.38 or is performing G.711 pass-through unaided. Similarly, stop commands 579a and 579b transition the state observer 280/380 from the pass CED state 516 and the suppress DIS state 563, respectively, to the idle state when the on-ramp gateway 430 is going to T.38.

Figure 6:
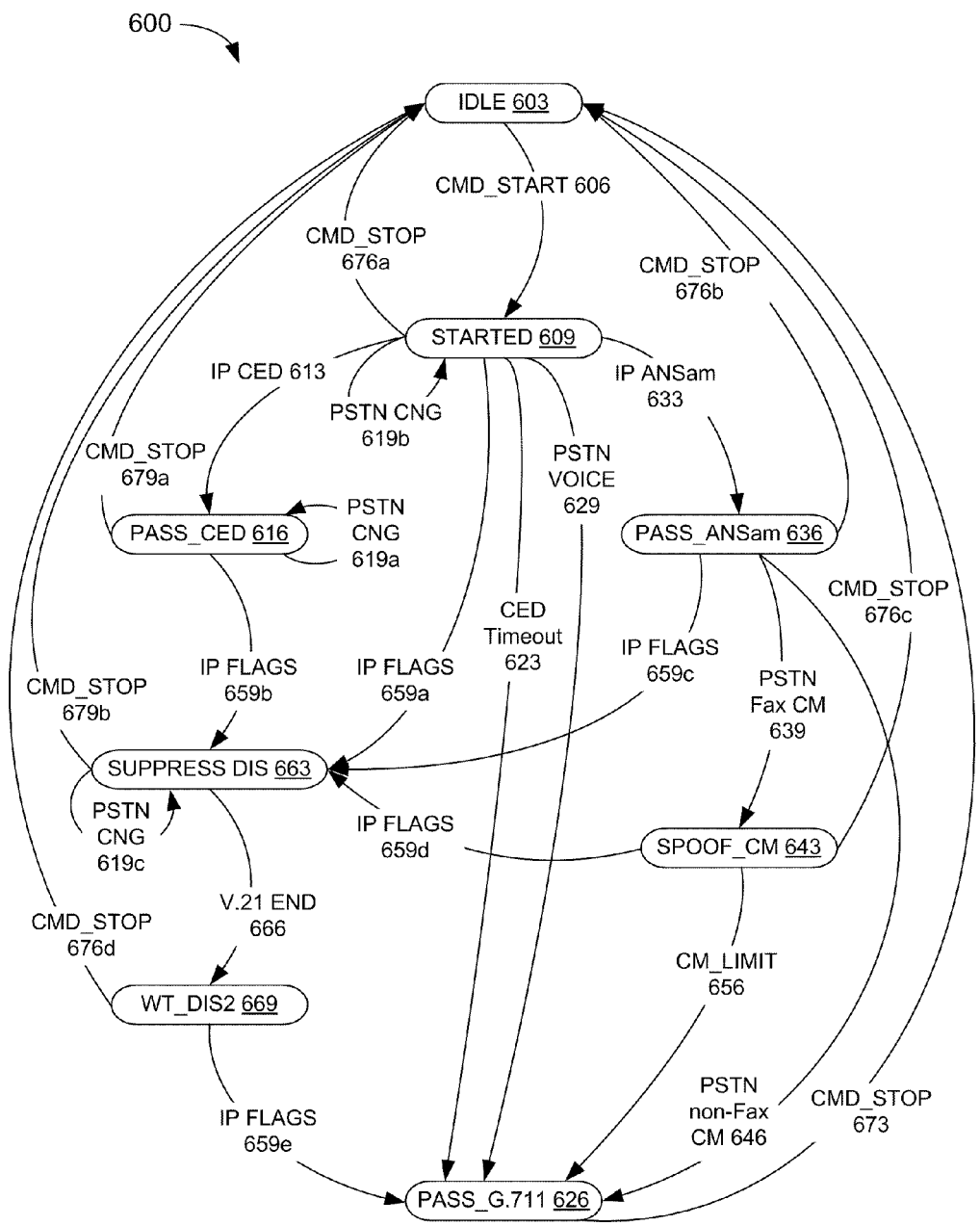

Referring next to FIG. 6, shown is a state diagram 600 illustrating an example of monitoring by a state observer 280/380 on an on-ramp gateway when V.34 fax operation is supported. Under V.34 operation, the on-ramp gateway 430 initiates a T.38 re-invite, which is accepted by the off-ramp gateway. While the embodiment of FIG. 6 is discussed in terms of the endpoint fax terminals and gateways of FIG. 4, the state monitoring is equally applicable to a fax application 320 on a server 310 (FIG. 3). The state observer 280/380 begins in an idle state 603 corresponding to the calling terminal being idle. When a fax session is initiated by the calling terminal 410, a start command 606 transitions the state observer 280/380 to a started state 609 corresponding to the calling terminal starting a calling session. In the started state 609, the on-ramp gateway 430 can accept and/or initiate a T.38 re-invite as the endpoint fax terminals 410/413 have not entered the negotiation phase of the fax session.

In the started state 609, the state observer 280/380 monitors the PSTN-IP and IP-PSTN data streams through the gateway. The monitoring may be accomplished using V.8 calling and called modems along with various tone and voice detectors. In some embodiments, a V.21 modem is attached to monitor the signaling messages sent across the G.711 pass-through. If a CED 613 is detected by the state observer 280/380, then the state observer 280/380 transitions to a state 616 where the CED is allowed to pass through unmodified. The pass CED state 616 corresponds to the calling terminal 410 having received the CED from the called terminal 413. If a fax calling tone (CNG) 619a is detected from the PSTN in the pass CED state 616, it is allowed to pass through unmodified. In the pass CED state 616, the on-ramp gateway 430 can accept and/or initiate a T.38 re-invite as the endpoint fax terminals 410/413 have not entered the negotiation phase of the fax session.

If the state observer 280/380 detects a PSTN CNG 619b (e.g., CNG 466 of FIG. 4) when in the started state 609, then a CED timer is initiated. In one embodiment, the CED timer is for five seconds. If a CED 613 is detected, than the CED timer is stopped and the state observer 280/380 transitions as described above. If a CED 613 is not detected and the CED timer times out 623, then the state observer 280/380 transitions to a G.711 pass through state 626 where full-duplex pass through is enabled. A CED timeout 623 indicates that the called device may not support fax sessions. Similarly, if a PSTN voice event 629 is detected, then the CED timer is stopped and the state observer 280/380 transitions to the G.711 pass through state 626 where full-duplex pass through is enabled. If the state observer 280/380 detects V.8bis signal indicating the answering terminal is a data modem, the state observer 280/380 transitions to the G.711 pass-through mode to support transparent modem operations. In the G.711 pass through state 626, the on-ramp gateway 430 no longer accepts and/or initiates T.38 re-invites and may choose to begin normal voice procedures.

If the state observer 280/380 detects an ANSam 633 when in the started state 609, then the CED timer is stopped and the state observer 280/380 transitions to a state 636 where the ANSam is allowed to pass through. In state 636, the IP-PSTN stream is allowed to pass through unmodified and the PSTN-IP stream is silenced. The pass ANSam state 636 corresponds to the calling terminal 410 having received the ANSam from the called terminal 413 and is expecting a CM form the calling terminal 410 if it supports V.8. In the pass ANSam state 636, the on-ramp gateway 430 can accept and/or initiate a T.38 re-invite as the endpoint fax terminals 410/413 have not entered the negotiation phase of the fax session. If a non-fax CM 646 is detected in the pass ANSam state 636, then the state observer 280/380 transitions to the G.711 pass through state 626 where full-duplex pass through is enabled and T.38 re-invites are no longer accepted and/or initiated. The on-ramp gateway 430 may remain in a real time transport (RTP) mode in the G.711 pass through state 626.

If the state observer 280/380 detects a fax CM 639 when in the pass ANSam state 636, then the state observer 280/380 transitions to a spoof CM state 643 where an invalid CM is sent to the called terminal 413 and a CM counter for counting CM transmissions is started. The state observer 280/380 also provides an indicator, e.g., to the SIP entity 370 and/or the call control entity 360 (FIG. 3) that it should re-invite to T.38. In the spoof CM state 643, the on-ramp gateway 430 can accept and/or initiate a T.38 re-invite as the endpoint fax terminals 410/413 have not entered the negotiation phase of the fax session. In traditional non-V.34 operations, the off-ramp gateway 433 is responsible for issuing the T.38 re-invite as discussed above. However, under V.34 the on-ramp gateway 430 suppresses the CM and performs the T.38 re-invite. Thus, in the spoof CM state 643, the on-ramp gateway 430 may initiate one or more T.38 re-invites to the off-ramp gateway 433. The on-ramp gateway 430 will continue to spoof CMs until a T.38 re-invite is accepted or a CM limit 656 is reached. If the CM limit 656 is reached (e.g., when CM counter exceeds a predefined limit) without detection of V.21 flags 659d, then the state observer 280/380 transitions to the G.711 pass through state 626 where full-duplex pass through is enabled and T.38 re-invites are no longer accepted or initiated. The on-ramp gateway 430 may remain a RTP mode in the G.711 pass through state 626.

Upon detection of V.21 flags 659a-659d on the IP to PSTN connection, it indicates that a preamble to the DIS is being sent across the packet network, the state observer 280/380 transitions from the started state 609, pass CED state 616, pass ANSam state 636, or the spoof CM state 643 to a suppress DIS state 663 where the preamble is allowed to pass, but the actual high-level data link control (HDLC) frames of the DIS have been corrupted or garbled. In the case of a transition from a started state 609 to the suppress DIS state 663, detection of V.21 flags 659a stops the CED timer if running. Similarly, in the case of a transition from a spoof CM state 643 to the suppress DIS state 663, detection of V.21 flags 659d stops the CM counter if running.

HDLC corruption can be performed in a number of ways such as, but not limited to, demodulation and re-modulation of the V.21 frames with invalid cyclic redundancy checks (CRCs), releasing buffer packets in reverse order after the preamble, discarding every other PCM buffer and repeating the previous buffer data and/or other appropriate garbling methods. Corruption of the DIS prevents the calling terminal 410 from proceeding in the negotiation phase of the fax session and allowing the on-ramp gateway 430 to accept a T.38 re-invite. When in this state 663, the on-ramp gateway 430 expects a T.38 re-invite to be sent by the off-ramp gateway 433. If a CNG 619c is detected in the suppress DIS state 663, it is allowed to pass through unmodified.

Without a response from the calling terminal 410 during non-V.34 operation, the called terminal 413 resends the DIS 476 at regular or predefined intervals until the calling terminal 410 sends its response (e.g., DCS 483) or a DIS timeout occurs. If a T-38 re-invite has not been received by the on-ramp gateway 430, corruption of the DIS 476 continues for the first DIS transmission. A V.21 end condition 666 transitions the state observer 280/380 to a second DIS state 669 where the state observer 280/380 waits for the preamble of a second DIS to be sent. When IP flags 659e of the preamble are detected, the state observer 280/380 transitions to the Pass G.711 state 626, where the second DIS is allowed to pass through to the calling terminal 410 without modification. The wait DIS2 state 669 corresponds to the calling terminal 410 not having received the first DIS from the called terminal 413 because it was garbled by the state observer 280/380 and thus not able to respond with a DCS to complete the fax negotiation. In the wait DIS2 state 669, the on-ramp gateway 430 may still accept a T.38 re-invite. However, upon detection of V.21 flags 659e, the state observer 280/380 transitions to the G.711 pass through state 626 where full-duplex pass through is enabled and the on-ramp gateway 430 no longer accepts and/or initiates T.38 re-invites. Some implementations may garble more than the first DIS, while others may not garble the DIS at all. Garbling of the DIS allows more time for the T.38 re-invite negotiations to be completed.

When a call is over and the session has been completed in the G.711 pass through state 626, a stop command 673 transitions the state observer 280/380 back to the idle state 603. Stop commands 676a-676d transition the state observer 280/380 from the started state 609, the pass ANSam state 636, the spoof CM state 643, and the wait DIS2 state 669, respectively, to the idle state when the on-ramp gateway 430 is going to V.34 under T.38 or is performing G.711 pass-through unaided. Similarly, stop commands 679a and 679b transition the state observer 280/380 from the pass CED state 616 and the suppress DIS state 663, respectively, to the idle state when the on-ramp gateway 430 is going to T.38.

Figure 7:
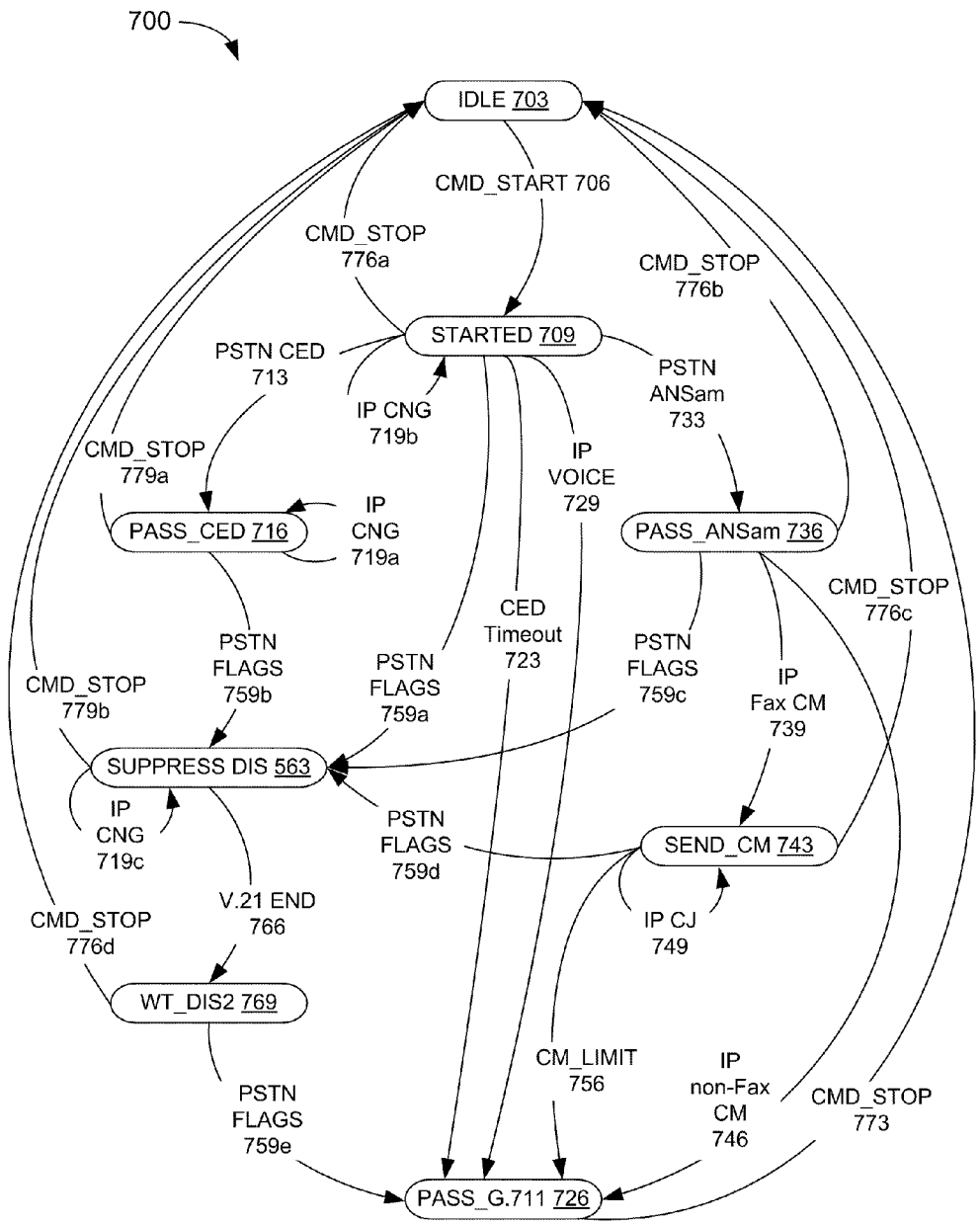
FIGS. 7 and 8 are state diagrams illustrating examples of monitoring by a state observer on an off-ramp gateway of FIG. 4 according to various embodiments of the present disclosure.

Referring now to FIG. 7, shown is a state diagram 700 illustrating an example of monitoring by a state observer 280/380 on an off-ramp gateway when V.34 fax operation is not supported. The off-ramp gateway allows V.8 messaging to pass from the called terminal to the calling terminal, but if the calling terminal responds with a fax call menu, then the call menu is adjusted to remove V.34 capability. While the embodiment of FIG. 5 is discussed in terms of the endpoint fax terminals and gateways of FIG. 4, the state monitoring is equally applicable to a fax application 320 on a server 310 (FIG. 3). As with an on-ramp gateway, the state observer 280/380 begins in an idle state 703 corresponding to the called terminal being idle. When a call is accepted at the off ramp gateway 433 as a response to a call initiated by the calling terminal 410 (e.g., by SIP invite message 456 in FIG. 4), a start command 706 transitions the state observer 280/380 to a started state 709 corresponding to the called terminal starting a session. In the started state 709, the off-ramp gateway 433 can initiate a T.38 re-invite as the endpoint fax terminals 410/413 have not entered the negotiation phase of the fax session.

In the started state 709, the state observer 280/380 monitors the PSTN-IP and IP-PSTN data streams through the gateway. The monitoring may be accomplished using V.8 calling and called modems along with various tone and voice detectors. In some embodiments, a V.21 modem is attached to monitor the signaling messages sent across the G.711 pass-through. If the state observer 280/380 detects a CED 713 (e.g., CED 469 of FIG. 4) from the called terminal 413, then the state observer 280/380 transitions to a state 716 where the CED is allowed to pass through unmodified. The pass CED state 716 corresponds to the called terminal 413 having sent the CED to the calling terminal 410. When in this state 716, the off-ramp gateway 433 can initiate a T.38 re-invite to the on-ramp gateway 430. If a CNG 719a is detected in the pass CED state 716, it is allowed to pass through unmodified. In the pass CED state 716, the off-ramp gateway 433 can initiate the T.38 re-invite as the endpoint fax terminals 410/413 have not entered the negotiation phase of the fax session.

If the state observer 280/380 detects an IP CNG 719b when in the started state 709, then a CED timer is initiated. In one embodiment, the CED timer is for five seconds. If a CED 713 is detected, then the CED timer is stopped and the state observer 280/380 transitions as described above. If a CED 713 is not detected and the CED timer times out 723, then the state observer 280/380 transitions to a G.711 pass through state 726 where full-duplex pass through is enabled. Similarly, if an IP voice event 729 is detected, then the CED timer is stopped and the state observer 280/380 transitions to the G.711 pass through state 726 where full-duplex pass through is enabled. In the G.711 pass through state 726, the off-ramp gateway 433 no longer initiates T.38 re-invites and may choose to begin normal voice procedures.

If the state observer 280/380 detects a PSTN ANSam 733 when in the started state 709, then the CED timer is cleared and the state observer 280/380 transitions to a state 736 where the ANSam is allowed to pass through. The pass ANSam state 736 corresponds to the called terminal 413 having sent the ANSam to the calling terminal 410. In the pass ANSam state 736, the off-ramp gateway 433 can initiate a T.38 re-invite as the endpoint fax terminals 410/413 have not entered the negotiation phase of the fax session. If the state observer 280/380 detects a fax CM 739 when in the pass ANSam state 736, then the state observer 280/380 transitions to a send CM state 743 where the CM is modified to remove V.34 capabilities and the modified CM is sent to the called terminal 413. If a non-fax CM 746 is detected in the pass ANSam state 736, then the state observer 280/380 transitions to the G.711 pass through state 726 where full-duplex pass through is enabled and T.38 re-invites are no longer initiated.

In some embodiments, when the end of the ANSam is detected in the pass ANSam state 736, an ANSam timer is started. For example, the ANSam timer may be a 500 millisecond timer. If the ANSam timer times out without detecting, e.g., a fax CM 739, non-fax CM 746, or V.21 flags 759c, then the state observer 280/380 transitions to the G.711 pass through state 726 where full-duplex pass through is enabled and T.38 re-invites are no longer initiated.

When the state observer 280/380 detects the CJ 749 in the send CM state 743, the CJ is passed through to the called terminal 413 and a flags timer is started. In one embodiment, the flags timer is set for 500 milliseconds. The send CM state 743 corresponds to the called terminal 413 having received the modified CM. In the send CM state 743, the off-ramp gateway 433 can initiate a T.38 re-invite as the endpoint fax terminals 410/413 have not entered the negotiation phase of the fax session. If a CM limit 756 is reached when the flags timer times out without detection of V.21 flags 759d, then the state observer 280/380 transitions to the G.711 pass through state 726 where full-duplex pass through is enabled and T.38 re-invites are no longer accepted.

Upon detection of V.21 flags 759a-759d such as the DIS 476 sent by the called gateway 433, the state observer 280/380 transitions from the started state 709, pass CED state 716, pass ANSam state 736, or the send CM state 743 to a suppress DIS state 763 where the preamble is allowed to pass, but the actual HDLC frames of the DIS are corrupted or garbled. In the case of a transition from a started state 709 to the suppress DIS state 763, detection of V.21 flags 759a stops the CED timer if running. If an ANSam timer was initiated in the pass ANSam state 736, detection of V.21 flags 759c stops the ANSam timer. Similarly, in the case of a transition from a send CM state 743 to the suppress DIS state 763, detection of V.21 flags 759d stops the flags timer if running. In all of these cases, an indicator is passed, e.g., to the call control entity 360 and/or the SIP entity 370, to inform the entities to initiate a T.38 re-invite.

HDLC corruption can be performed in a number of ways such as, but not limited to, demodulation and re-modulation of the V.21 frames with invalid CRCs, releasing buffer packets in reverse order after the preamble, discarding every other PCM buffer and repeating the previous buffer data and/or other appropriate garbling methods. Corruption of the DIS prevents the calling terminal 410 from proceeding in the negotiation phase of the fax session and allowing the off-ramp gateway 433 to initiate a T.38 re-invite. When in this state 763, the off-ramp gateway 433 sends a T.38 re-invite to the on-ramp gateway 430. If a CNG 719c is detected in the suppress DIS state 763, it is allowed to pass through unmodified.

Without a response from the calling terminal 410, the called terminal 413 resends the DIS 476 at regular or predefined intervals until the calling terminal 410 sends its response or a DIS timeout occurs. For example, the DIS 476 may be resent by the called terminal 413 every 3.5 seconds until the DIS timeout is reached (e.g., up to about 35 seconds) or a response (e.g., DCS 483) is sent by the calling terminal 410. If a T-38 re-invite is not sent by the off-ramp gateway 433, corruption of the DIS 476 continues until the end of the DIS is reached.

A V.21 end condition 766 transitions the state observer 280/380 to a second DIS state 769 where the state observer 280/380 waits for the preamble to the second DIS from the called terminal 413. The wait DIS2 state 769 corresponds to the called terminal 413 having sent the DIS to the calling terminal 410, but it was garbled and thus not respond to it with a DCS to complete the fax negotiation. In the wait DIS2 state 769, the off-ramp gateway 433 may still initiate a T.38 re-invite. However, upon detection of V.21 flags 759e, the state observer 280/380 transitions to the G.711 pass through state 726 where full-duplex pass through is enabled and the off-ramp gateway 433 no longer initiates T.38 re-invites.

When a call is over and the session has been completed in the G.711 pass through state 726, a stop command 773 transitions the state observer 280/380 back to the idle state 703. Stop commands 776a-776d transition the state observer 280/380 from the started state 709, the pass ANSam state 736, the send CM state 743, and the wait DIS2 state 769, respectively, to the idle state when the off-ramp gateway 433 is going to V.34 under T.38 or is performing G.711 pass-through unaided. Similarly, stop commands 779a and 779b transition the state observer 280/380 from the pass CED state 716 and the suppress DIS state 763, respectively, to the idle state when the off-ramp gateway 433 is going to T.38. Some implementations may garble more than the first DIS, while others may not garble the DIS at all. Garbling of the DIS allows more time for the T.38 re-invite negotiations to be completed.

Figure 8:
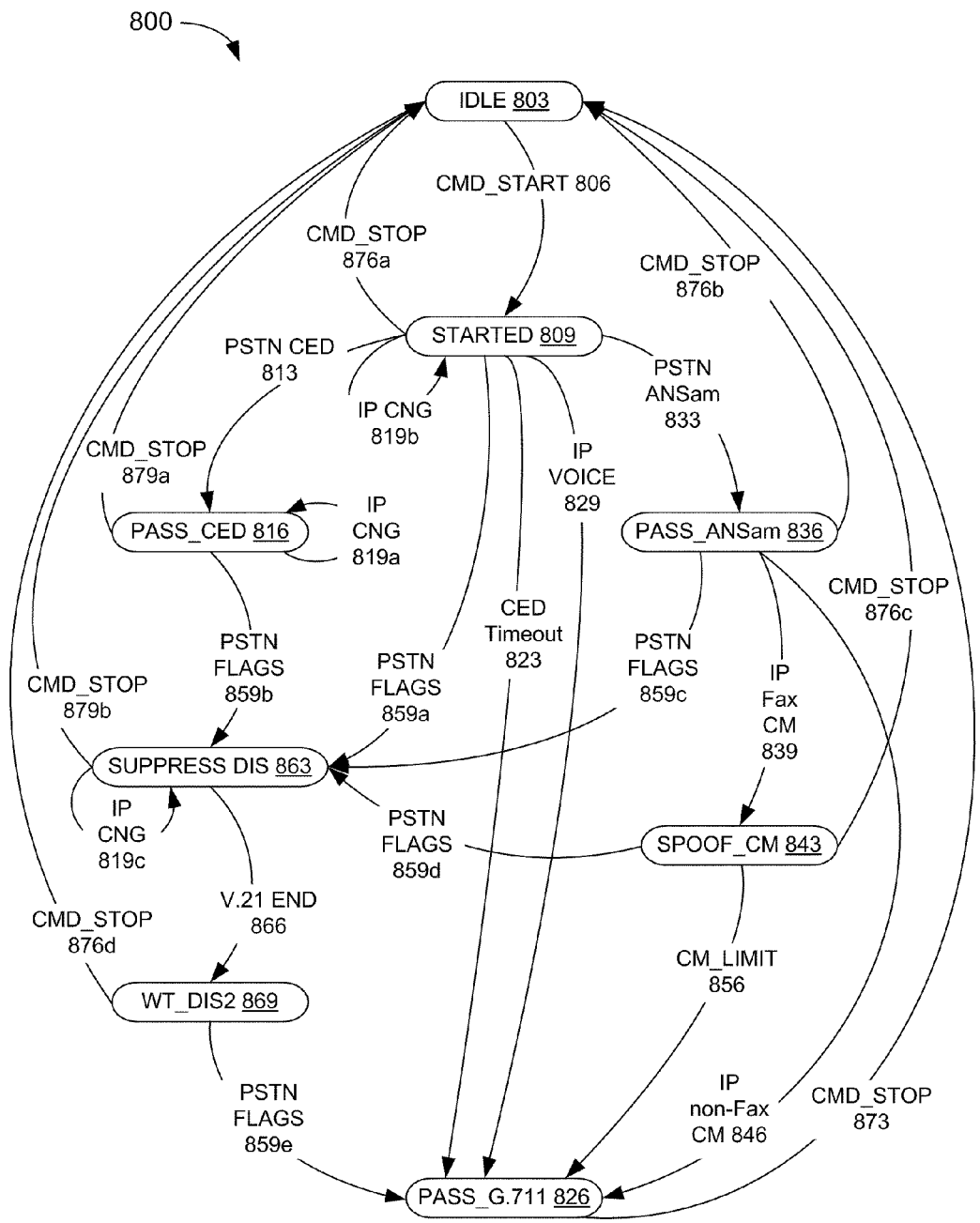

Referring next to FIG. 8, shown is a state diagram 800 illustrating an example of monitoring by a state observer 280/380 on an off-ramp gateway when V.34 fax operation is supported. Under V.34 operation, the on-ramp gateway 430 initiates a T.38 re-invite, which is accepted by the off-ramp gateway. However, some on-ramp gateways do not initiate the T.38 re-invite and either case is handled here. While the embodiment of FIG. 8 is discussed in terms of the endpoint fax terminals and gateways of FIG. 4, the state monitoring is equally applicable to a fax application 320 on a server 310 (FIG. 3). The state observer 280/380 begins in an idle state 803 corresponding to the calling terminal being idle. When a call is initiated by the calling terminal 410, a start command 806 transitions the state observer 280/380 to a started state 809 corresponding to the called terminal starting a calling session. In the started state 809, the off-ramp gateway 433 can initiate and/or accept a T.38 re-invite as the endpoint fax terminals 410/413 have not entered the negotiation phase of the fax session.

In the started state 809, the state observer 280/380 monitors the PSTN-IP and IP-PSTN data streams through the gateway. The monitoring may be accomplished using V.8 calling and called modems along with various tone and voice detectors. In some embodiments, a V.21 modem is attached to monitor the signaling messages sent across the G.711 pass-through. If the state observer 280/380 detects a V.8bis signal indicating that the answering terminal is a data modem, the state observer 280/380 transitions to the G.711 pass-through mode to support transparent modem operation. If a CED 813 is detected by the state observer 280/380, then the state observer 280/380 transitions to a state 816 where the CED is allowed to pass through unmodified. The pass CED state 816 corresponds to the called terminal 413 having sent the CED to the calling terminal 410. If a CNG 819a is detected in the pass CED state 816, it is allowed to pass through unmodified. In the pass CED state 816, the off-ramp gateway 433 can initiate and/or accept a T.38 re-invite as the endpoint fax terminals 410/413 have not entered the negotiation phase of the fax session.

If the state observer 280/380 detects an IP CNG 819b when in the started state 809, then a CED timer is initiated. In one embodiment, the CED timer is for five seconds. If a CED 813 is detected, than the CED timer is stopped and the state observer 280/380 transitions as described above. If a CED 813 is not detected and the CED timer times out 823, then the state observer 280/380 transitions to a G.711 pass through state 826 where full-duplex pass through is enabled. Similarly, if a IP voice event 829 is detected, then the CED timer is stopped and the state observer 280/380 transitions to the G.711 pass through state 826 where full-duplex pass through is enabled. In the G.711 pass through state 826, the off-ramp gateway 433 no longer initiates and/or accepts T.38 re-invites and may choose to begin normal voice procedures.

If the state observer 280/380 detects a PSTN ANSam 833 when in the started state 809, then the CED timer is stopped and the state observer 280/380 transitions to a state 836 where the ANSam is allowed to pass through. In this state, the PSTN-IP stream is allowed to pass through unmodified and the IP-PSTN stream is suppressed. The pass ANSam state 836 corresponds to the called terminal 413 having sent the ANSam to the calling terminal 410. In the pass ANSam state 836, the off-ramp gateway 433 can initiate and/or accept a T.38 re-invite as the endpoint fax terminals 410/413 have not entered the negotiation phase of the fax session. If a non-fax CM 846 is detected in the pass ANSam state 836, then the state observer 280/380 transitions to the G.711 pass through state 826 where full-duplex pass through is enabled and T.38 re-invites are no longer accepted and/or initiated. The off-ramp gateway 433 may remain in a RTP mode in the G.711 pass through state 826.

If the state observer 280/380 detects a fax CM 839 when in the pass ANSam state 836, then the state observer 280/380 transitions to a spoof CM state 843 where an invalid CM is sent to the called terminal 413 and a CM counter is started. The state observer 280/380 also provides an indicator, e.g., to the call control entity 360 and/or the SIP entity 370 (FIG. 3) that it should re-invite to T.38. In the spoof CM state 843, the off-ramp gateway 433 can initiate and/or accept a T.38 re-invite as the endpoint fax terminals 410/413 have not entered the negotiation phase of the fax session. In traditional non-V.34 operations, the off-ramp gateway 433 is responsible for issuing the T.38 re-invite as discussed above. However, under the 2010 SIP procedures for V.34, the off-ramp gateway 433 awaits the T.38 re-invite from the on-ramp gateway 430. If the on-ramp gateway 430 conforms, it will suppress the CM so the off-ramp gateway 433 does not receive a CM. If a CM is received it indicates the on-ramp gateway 430 does not conform and the off-ramp gateway 433 will issue the re-invite. Thus, in the spoof CM state 843, the on-ramp gateway 430 may initiate one or more T.38 re-invites to the off-ramp gateway 433. The off-ramp gateway 430 will continue to spoof CMs until a T.38 re-invite is received or accepted or the CM limit 856 is reached. If the CM limit 856 is reached (e.g., when CM counter exceeds a predefined limit) without detection of V.21 flags 859d, then the state observer 280/380 transitions to the G.711 pass through state 826 where full-duplex pass through is enabled and T.38 re-invites are no longer accepted or initiated. The on-ramp gateway 430 may remain a RTP mode in the G.711 pass through state 826.

Upon detection of V.21 flags 859a-859d that are part of the preamble to the first DIS sent by the called terminal 413, the state observer 280/380 transitions from the started state 809, pass CED state 816, pass ANSam state 836, or the spoof CM state 843 to a suppress DIS state 863 where the preamble is allowed to pass, but the actual HDLC frames of the DIS have been corrupted or garbled. An indicator is sent to, e.g., the call control entity 360 and/or the SIP entity to re-invite to T.38. In the case of a transition from a started state 809 to the suppress DIS state 863, detection of V.21 flags 859a stops the CED timer if running. Similarly, in the case of a transition from a spoof CM state 843 to the suppress DIS state 863, detection of V.21 flags 859d stops the CM counter if running.

HDLC corruption can be performed in a number of ways such as, but not limited to, demodulation and re-modulation of the V.21 frames with invalid cyclic redundancy checks (CRCs), releasing buffer packets in reverse order after the preamble, discarding every other PCM buffer and repeating the previous buffer data and/or other appropriate garbling methods. Corruption of the DIS prevents the calling terminal 410 from proceeding in the negotiation phase of the fax session and allowing the on-ramp gateway 430 to accept a T.38 re-invite. When in this state 863, the on-ramp gateway 430 expects a T.38 re-invite to be sent by the off-ramp gateway 433. If a CNG 819c is detected in the suppress DIS state 863, it is allowed to pass through unmodified.

Without a response from the calling terminal 410 during non-V.34 operation, the called terminal 413 resends the DIS 476 at regular or predefined intervals until the calling terminal 410 sends its response (e.g., DCS 483) or a DIS timeout occurs. If the T-38 re-invite has not been accepted by the on-ramp gateway 430, corruption of the DIS 476 continues until the end of the DIS is reached. A V.21 end condition 866 transitions the state observer 280/380 to a second DIS state 869 where the state observer 280/380 waits for a second preamble to occur. The wait DIS2 state 869 corresponds to the calling terminal 410 having received the corrupt DIS from the called terminal 413 and thus was not able to respond with a DCS to complete the fax negotiation. In the wait DIS2 state 869, the off-ramp gateway 433 may still initiate a T.38 re-invite. However, upon detection of V.21 flags 859e, the state observer 280/380 transitions to the G.711 pass through state 826 where full-duplex pass through is enabled and the off-ramp gateway 433 no longer initiates and/or accepts T.38 re-invites. Some implementations may garble more than the first DIS, while others may not garble the DIS at all. Garbling of the DIS allows more time for the T.38 re-invite negotiations to be completed.

When a call is over and the session has been completed in the G.711 pass through state 826, a stop command 873 transitions the state observer 280/380 back to the idle state 803. Stop commands 876a-876d transition the state observer 280/380 from the started state 809, the pass ANSam state 836, the spoof CM state 843, and the wait DIS2 state 869, respectively, to the idle state when the off-ramp gateway 433 is going to V.34 under T.38 or is performing G.711 pass-through unaided. Similarly, stop commands 879a and 879b transition the state observer 280/380 from the pass CED state 816 and the suppress DIS state 863, respectively, to the idle state when the off-ramp gateway 433 is going to T.38.

The state observer 280/380 described with respect to FIGS. 5-8 may also be implemented on a fax server 310 (FIG. 3). The state observer 280/380 may be implemented separately from the T.30 subsystem 330 or may be implemented as part of the T.30 subsystem. In some embodiments, a V.21 modem is used to monitor the fax communications through the fax server 310.

Figure 9:
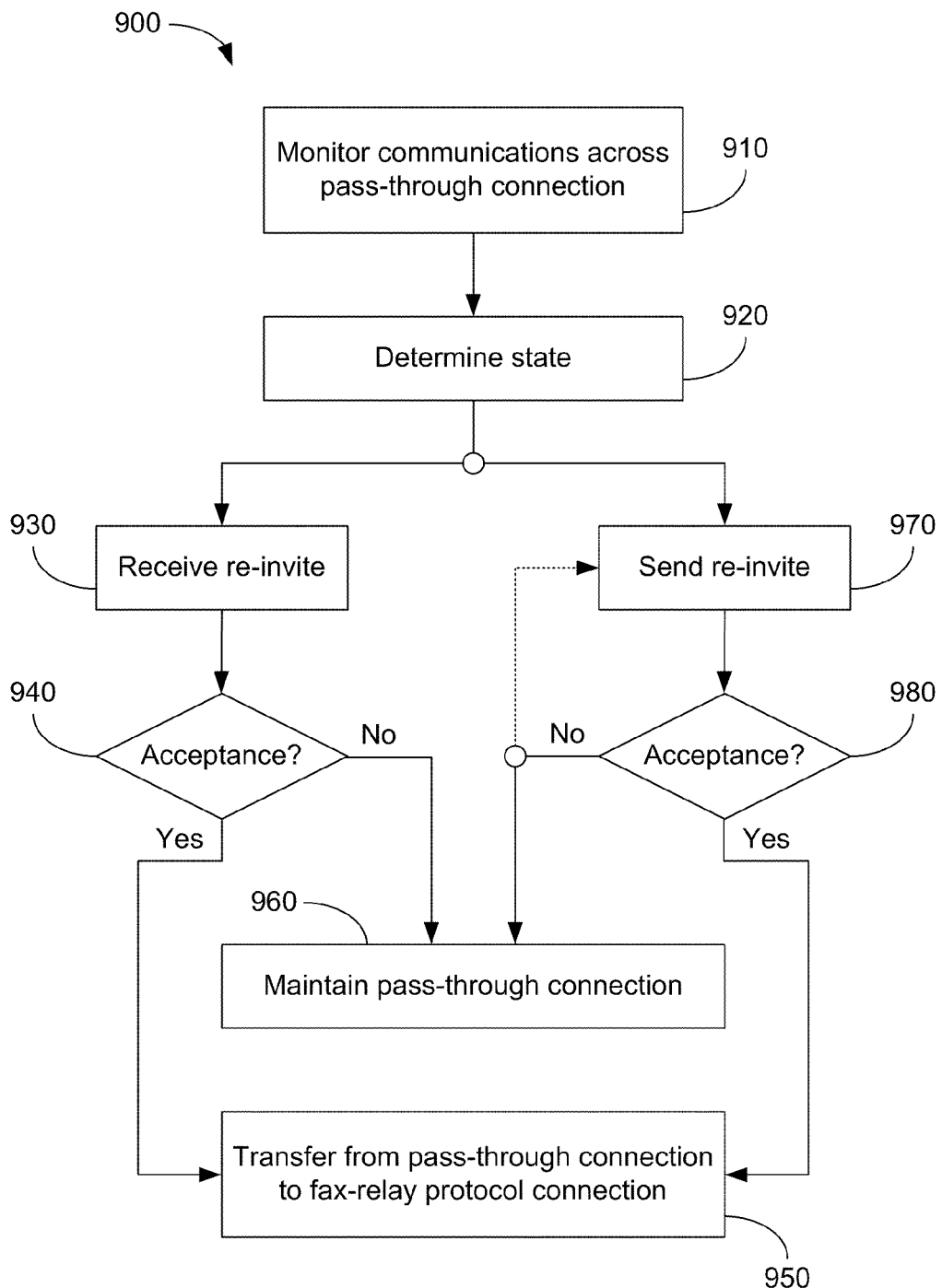
FIG. 9 is a flowchart illustrating a method for transferring fax communications via the packet-based data network of FIG. 1 according to various embodiments of the present disclosure.

Referring now to FIG. 9, shown is a flow chart illustrating an exemplary method for interlocking and synchronizing the termination of the initial pass-through phase of a fax session with the switchover to and initiation of the fax-relay protocol (e.g., T.38) phase of the session. Beginning with block 910, communications are across the pass-through connection. For example, V.8 and/or V.21 messaging over a G.711 pass-through connection are monitored. In some embodiments, a V.21 modem is used to monitor the communications over the pass-through connection. A state is determined in block 920 based at least in part upon the monitored communications. In some embodiments, determined the state is the state of a state machine, e.g., an endpoint fax terminal 230 (FIG. 2) or a fax application 320 on a fax server 310 (FIG. 3). In other embodiments, the state is an observer state associated with a state of the state machine. Transfer from the pass-through connection to a fax-relay protocol (e.g., T.38) connection may then be controlled based at least in part upon the monitored communications.

In some embodiments, the gateway 230 (FIG. 2) and/or fax server 310 (FIG. 3) wait for a re-invite to the fax-relay protocol (e.g., a T.38 re-invite) before initiating a transfer. If the re-invite to the fax-relay protocol is received in block 930, then acceptance of the re-invite to the fax-relay protocol is determined in block 940. In some embodiments, the state observer 280/380 provides an indication of acceptance of the re-invite to the fax-relay protocol based at least in part upon the monitored communications. If the re-invite to the fax-relay protocol is accepted, then transfer from the pass-through connection to the fax-relay protocol connection is carried out by gateway 230 and/or fax server 310 in block 950. If the re-invite to the fax-relay protocol is not accepted, then the transfer is prevented and the pass-through connection is maintained in block 960.

In alternative embodiments, the gateway 230 and/or fax server 310 initiate a re-invite to the fax-relay protocol (e.g., a T.38 re-invite) based at least in part upon the monitored communications. After the re-invite to the fax-relay protocol is sent in block 970, the gateway 230 and/or fax server 310 awaits acceptance of the re-invite to the fax-relay protocol. If acceptance of the re-invite to the fax-relay protocol is received in block 980, then transfer from the pass-through connection to the fax-relay protocol connection may be carried out by the gateway 230 and/or fax server 310 in block 950. If the re-invite to the fax-relay protocol is not received (e.g., prior to the calling terminal's DCS or within a predetermined time period after transmission), then the pass-through connection is maintained in block 960. For example, if a timeout condition has expired or a DCS has been detected, then the pass-through connection is maintained in block 960 without resending another re-invite to the fax-relay protocol. If acceptance of a re-invite to the fax-relay protocol (e.g., to T.38) is still possible, another re-invite to the fax-relay protocol may be resent in block 970 and the gateway 230 and/or fax server 310 wait to receive an acceptance in block 980 while maintaining the pass-through connection.

In the pass G.711 state (526 of FIG. 5, 626 of FIG. 6, 726 of FIGS. 7, and 826 of FIG. 8), a common problem is jitter buffer overflow or underflow caused by the mismatch of the on-ramp and off-ramp PCM clocks. If the passed signal in this state is a fax call, the state observer 280/380 provides an indicator to the gateway or fax server when it is safe to reset the RTP jitter buffers in a specific direction. This indicator is set whenever a V.21 signal completes during the fax session, except if that V.21 contains a DCS. This indicator allows the gateway to reset the jitter buffer in the specified direction to prevent overflow or underflow of that jitter buffer due to PCM clock drift. The indicator shall remain active for some period of time but short enough to ensure it is cleared prior to the next signal on that path. For V.34 operations, the indicator is made active when the high-band QAM modem stops and remains active for a nominal 200 ms. Also, for V.34 operations the indicator is made active whenever low-band QAM modem stops and remains active for no more than 40 ms.

The V.8bis signals are future replacements for the V.8 signals: ANSam and CM. Currently, V.8bis is not specified for fax in T.30, nor in T.38. However, if V.8bis is used for fax, the method here can be expanded to track the state of the V.8bis interchange and provide an indicator to the gateway to either send or accept a T.38 re-invite.

Figure 10:
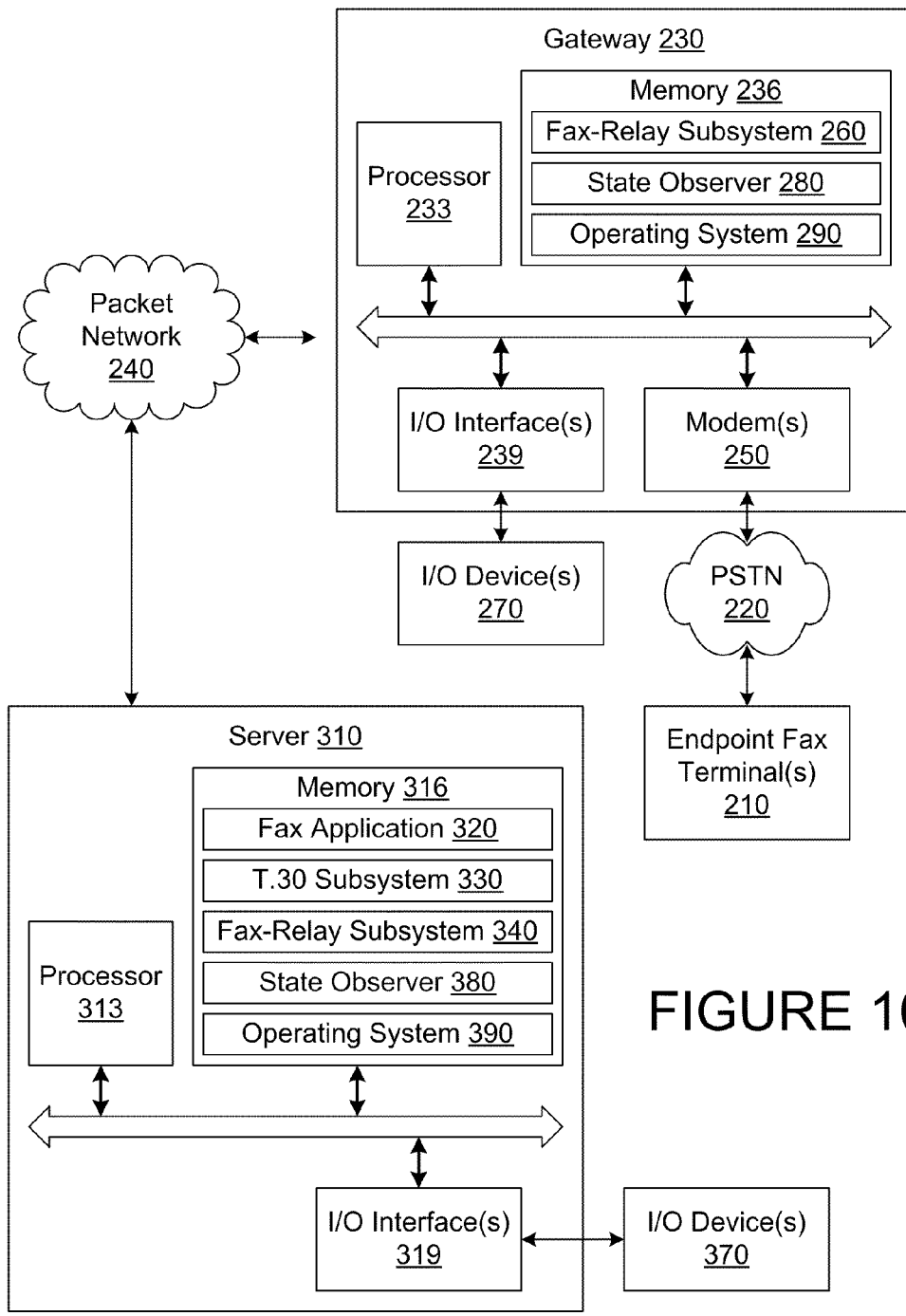
FIG. 10 is a schematic block diagram that provides an illustration of a PSTN-IP gateway of FIG. 2 and an IP-based fax server of FIG. 3 employed in the networked environment of FIG. 1 according to various embodiments of the present disclosure.

Referring next to FIG. 10, shown is a schematic block diagram of examples of a PSTN-IP gateway 230 and an IP-based fax server 310 in communication with a packet-based data network 240 according to various embodiments of the present disclosure. The PSTN-IP gateway 230 includes a processor 233, a memory 236 and one or more I/O device interface(s) 239, all of which are coupled to a local interface. The local interface may comprise, for example, a data bus with an accompanying address/control bus or other bus structure as can be appreciated. The I/O device interface(s) 239 may be coupled to one or more input/output device 270 that may be coupled to input devices such as, but not limited to, a keyboard, mouse, touch screen, microphone, etc. Further, the input/output device(s) 270 may also include output devices such as, but not limited to, a printer, display, speaker, etc. Further, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc. The PSTN-IP gateway 230 also includes one or more modem(s) 250 in communication with endpoint fax terminal(s) 210, e.g., through PSTN 220.

Stored in the memory 236 are both data and several components that are executable by the processor 233. For example, stored in the memory 236 and executable by the processor 233 are a fax-relay subsystem 260, a state observer 280, and potentially other applications. Also stored in the memory 236 may be an operating system 290 executable by the processor 233. In addition, a database and other data may be stored in the memory 236. While not illustrated, it is understood that there may be remote databases that are accessible to the gateway 230 through the local interface.

The IP-based fax server 310 includes a processor 313, a memory 316 and one or more I/O device interface(s) 319, all of which are coupled to a local interface. The local interface may comprise, for example, a data bus with an accompanying address/control bus or other bus structure as can be appreciated. The I/O device interface(s) 319 may be coupled to one or more input/output device 370 that may be coupled to input devices such as, but not limited to, a keyboard, mouse, touch screen, microphone, etc. Further, the input/output device(s) 370 may also include output devices such as, but not limited to, a printer, display, speaker, etc. Further, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Stored in the memory 316 are both data and several components that are executable by the processor 313. For example, stored in the memory 316 and executable by the processor 313 are a fax application 320, a T.30 subsystem 330, a fax-relay subsystem 340, a state observer 380, and potentially other applications. Also stored in the memory 316 may be an operating system 390 executable by the processor 313. In addition, a database and other data may be stored in the memory 316. While not illustrated, it is understood that there may be remote databases that are accessible to the fax server 310 through the local interface.

It is understood that there may be other applications that are stored in the memory 236 and/or 316 and are executable by the processors 233 and/or 313, respectively, as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, R, or other programming languages.

A number of software components are stored in the memory 236 and/or 316 and are executable by the processors 233 and/or 313, respectively. In this respect, the term "executable" means a program file that is in a form that can ultimately be run by the processors 233 and/or 313. Examples of executable programs may be, for example, a compiled program that can be translated into machine code in a format that can be loaded into a random access portion of the memory 236 and/or 316 and run by the processors 233 and/or 313, respectively, source code that may be expressed in proper format such as object code that is capable of being loaded into a random access portion of the memory 236 and/or 316 and executed by the processors 233 and/or 313, respectively, or source code that may be interpreted by another executable program to generate instructions in a random access portion of the memory 236 and/or 316 to be executed by the processors 233 and/or 313, respectively, etc. An executable program may be stored in any portion or component of the memory 236 and/or 316 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 236 and 316 is defined herein as including both volatile and nonvolatile memory and data storage components. Volatile components are those that do not retain data values upon loss of power. Nonvolatile components are those that retain data upon a loss of power. Thus, the memory 236 and 316 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 233 and 313 may each represent multiple processors and the memory 236 and 316 may each represent multiple memories that operate in parallel processing circuits, respectively. In such a case, the local interface may be an appropriate network that facilitates communication between any two of the multiple processors 233 and 313, between any processors 233 and 313 and any of the memories 236 and 316, or between any two of the memories 236 and 316, etc. The local interface may comprise additional systems designed to coordinate this communication, including, for example, performing load balancing. The processors 233 and 313 may be of electrical or of some other available construction.

Although the state observers 280 and 380 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The graphical representation of FIGS. 5-9 and flow chart of FIG. 9 illustrate the functionality and operation of an implementation of portions of the state observers 280 and 380. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 233 and 313 in gateway 230 and fax server 310, respectively, as well as a processor in a computer system or other system. The machine code may be converted from the source code, etc. If embodied in hardware, each block may represent a circuit or a number of interconnected circuits to implement the specified logical function(s).

Although the graphical representation of FIGS. 5-8 and flow chart of FIG. 9 show a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIGS. 5-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the state observers 280 and 380, that comprises software or code can be embodied in any non-transitory computer-readable medium for use by or in connection with an instruction execution system such as, for example, processors 233 and 313 in gateway 230 and fax server 310, respectively, as well as a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A gateway, comprising:
   a modem configured to examine communications of an endpoint fax terminal; and
   a state observer configured to:
      monitor media stream communications of the endpoint fax terminal that are transmitted across a pass-through connection between the gateway and a corresponding packet network device that is a server or another gateway, the monitored media stream communications indicating a state of the endpoint fax terminal; and
      control transfer of the media stream communications from the pass-through connection to a fax-relay protocol connection between the gateway and the corresponding packet network device in response to a re-invite to a fax-relay protocol, where rejection of the re-invite is based at least in part upon the endpoint fax terminal having entered a negotiation phase via the pass-through connection as indicated by detection of a digital command signal (DCS) message being communicated via the monitored media stream communications in response to a digital identification signal (DIS) message.

2. The gateway of claim 1, wherein the fax-relay protocol connection is a T.38 connection.

3. The gateway of claim 1, wherein the monitored media stream communications include V.21 flags.

4. The gateway of claim 1, wherein the state observer tracks a current observer state associated with the state of the endpoint fax terminal, the current observer state determined based at least in part upon the monitored media stream communications.

5. The gateway of claim 4, wherein the state observer is configured to transition the current observer state in response to the monitored media stream communications.

6. The gateway of claim 4, wherein the state observer is configured to allow acceptance of the re-invite to the fax-relay protocol by the gateway based upon the current observer state, acceptance of the re-invite to the fax-relay protocol initiating transfer of the media stream communications from the pass-through connection to the fax-relay protocol connection.

7. The gateway of claim 6, wherein the gateway is configured to spoof a fax call menu (CM) if the re-invite to the fax-relay protocol has been rejected.

8. The gateway of claim 4, wherein the state observer is configured to prevent acceptance of the re-invite to the fax-relay protocol by the gateway based upon the current observer state, the re-invite to the fax-relay protocol requesting transfer of the media stream communications from the pass-through connection to the fax-relay protocol connection.

9. A gateway, comprising:
a modem configured to examine communications of an endpoint fax terminal; and
a state observer configured to:
monitor media stream communications of the endpoint fax terminal that are transmitted across a pass-through connection between the gateway and a corresponding packet network device that is a server or another gateway, the monitored media stream communications indicating a state of the endpoint fax terminal associated with a current observer state; and
control transfer of the media stream communications from the pass-through connection to a fax-relay protocol connection between the gateway and the corresponding packet network device based at least in part upon the monitored media stream communications, where the gateway is configured to allow acceptance of a re-invite to a fax-relay protocol by the gateway based upon the current observer state, acceptance of the re-invite initiating transfer of the media stream communications from the pass-through connection to the fax-relay protocol connection, and suppress a digital identification signal (DIS) if the re-invite to the fax-relay protocol has not been accepted.

10. A fax server, comprising:
a virtual endpoint fax terminal including a fax application and a T.30 subsystem; and
a state observer configured to:
monitor a state of the virtual endpoint fax terminal based at least in part upon indications from the T.30 subsystem and a signaling entity of the fax server, the indications based at least in part upon media stream communications of the virtual endpoint fax terminal that are communicated across a pass-through connection between the fax server and a corresponding packet network device that is another server or a gateway; and
control transfer of the media stream communications of the virtual endpoint fax terminal from the pass-through connection to a fax-relay protocol connection between the fax server and the corresponding packet network device in response to a re-invite to a fax-relay protocol, where rejection of the re-invite is based at least in part upon the virtual endpoint fax terminal having entered a pass-through negotiation state as indicated by the T.30 subsystem and the signaling entity based upon detection of a digital command signal (DCS) message being communicated across the pass-through connection in response to a digital identification signal (DIS) message.

11. The fax server of claim 10, wherein the fax-relay protocol connection is a T.38 connection.

12. The fax server of claim 10, wherein the state observer tracks a current observer state associated with the state of the virtual endpoint fax terminal, the current observer state determined based at least in part upon the indications from the T.30 subsystem and the signaling entity.

13. The fax server of claim 12, wherein the state observer is configured to transition the current observer state in response to the indications from the T.30 subsystem and the signaling entity.

14. The fax server of claim 12, wherein the state observer is configured to allow acceptance of the re-invite to the fax-relay protocol by the fax server based upon the current observer state, acceptance of the re-invite to the fax-relay protocol initiating transfer of the media stream communications from the pass-through connection to the fax-relay protocol connection.

15. The fax server of claim 12, wherein the state observer is configured to prevent acceptance of the re-invite to the fax-relay protocol by the fax server based upon the current observer state, the re-invite to the fax-relay protocol requesting transfer of the media stream communications from the pass-through connection to the fax-relay protocol connection.

16. The fax server of claim 15, wherein the fax server is configured to spoof a fax call menu if the re-invite to the fax-relay protocol has been rejected.

17. The fax server of claim 10, wherein the signaling entity is a SIP entity.

18. A fax server, comprising:
a virtual endpoint fax terminal including a fax application and a T.30 subsystem; and
a state observer configured to:
monitor a state of the virtual endpoint fax terminal based at least in part upon indications from the T.30 subsystem and a signaling entity, the state of the virtual endpoint fax terminal associated with a current observer state; and
control transfer of media stream communications of the virtual endpoint fax terminal from a pass-through connection between the fax server and a corresponding packet network device that is another server or a gateway, to a fax-relay protocol connection between the fax server and the corresponding packet network device based at least in part upon the indications from the T.30 subsystem and the signaling entity, where the state observer is configured to allow acceptance of a re-invite to a fax-relay protocol by the fax server based upon the current observer state, the re-invite to the fax-relay protocol requesting transfer of the media stream communications from the pass-through connection to the fax-relay protocol connection, and the fax server is configured to suppress a digital identification (DIS) signal if the re-invite to the fax-relay protocol has not been accepted.

19. A method, comprising:
monitoring fax media stream communications of an endpoint fax terminal that are transmitted across a G.711 pass-through connection between two packet network devices comprising a gateway, a server, or both; and
controlling transfer of the fax media stream communications from the G.711 pass-through connection to a fax-relay protocol connection between the two packet network devices in response to a re-invite to a fax-relay protocol, where rejection of the re-invite is based at least in part upon the endpoint fax terminal having entered a negotiation phase via the G.711 pass-through connection as indicated by detection of a digital command signal (DCS) message being communicated via the monitored fax media stream communications in response to a digital identification signal (DIS) message.

20. The method of claim 19, further comprising determining a current state based at least in part upon the monitored fax media stream communications.

21. The method of claim 20, wherein the current state is associated with a state of an endpoint fax terminal communicating across the G.711 pass-through connection.

22. The method of claim 20, wherein the current state is associated with a state of a fax application communicating across the G.711 pass-through connection.

23. The method of claim 20, wherein transfer of the fax media stream communications is controlled based at least in part upon the current state.

24. The method of claim 20, further comprising:
receiving the re-invite to the fax-relay protocol requesting transfer of the fax media stream communications from the G.711 pass-through connection to the fax-relay protocol connection; and
accepting the re-invite to the fax-relay protocol to initiate transfer from the G.711 pass-through connection to the fax-relay protocol connection based at least in part upon the current state.

25. The method of claim 20, further comprising:
receiving the re-invite to the fax-relay protocol requesting transfer of the fax media stream communications from the G.711 pass-through connection to the fax-relay protocol connection; and
rejecting the re-invite to the fax-relay protocol to prevent transfer from the G.711 pass-through connection to the fax-relay protocol connection based at least in part upon the current state.

26. The method of claim 20, further comprising sending the re-invite to the fax-relay protocol based at least in part upon the current state, the re-invite to the fax-relay protocol requesting transfer of the fax media stream communications from the G.711 pass-through connection to the fax-relay protocol connection.

27. The method of claim 26, further comprising spoofing a fax call menu (CM) if the re-invite to the fax-relay protocol has been rejected.

28. The method of claim 19, wherein the endpoint fax terminal is a virtual endpoint fax terminal.

29. A method, comprising:
monitoring fax media stream communications across a G.711 pass-through connection between two packet network devices comprising a gateway, a server, or both;
determining a current state based at least in part upon the monitored fax media stream communications;
receiving a re-invite to a fax-relay protocol requesting transfer of the fax media stream communications from the G.711 pass-through connection to a fax-relay protocol connection between the two packet network devices;
controlling transfer of the fax media stream communications from the G.711 pass-through connection to the fax-relay protocol connection based at least in part upon the current state; and
suppressing a digital identification signal (DIS) if the re-invite to the fax-relay protocol has not been accepted.

30. A method, comprising:
monitoring a state of a state machine communicating over a pass-through connection between two packet network devices comprising a gateway, a server, or both; and
in response to acceptance of a re-invite to a fax-relay protocol, transferring communications of the state machine from the pass-through connection to a fax-relay protocol connection between the two packet network devices, where the re-invite is rejected if a pass-through negotiation state has been entered as indicated by the state of the state machine, where initiation of the pass-through negotiation state is based upon detection of a digital command signal (DCS) message being communicated across the pass-through connection in response to a digital identification signal (DIS) message.

31. The method of claim 30, wherein monitoring the state of the state machine comprises:
monitoring state machine communications across the pass-through connection; and
tracking a current state of the state machine, the current state determined based at least in part upon the monitored state machine communications.

32. The method of claim 31, wherein the current state transitions in response to the monitored state machine communications.

33. The method of claim 30, further comprising:
receiving the re-invite to the fax-relay protocol requesting transfer from the pass-through connection to the fax-relay protocol connection, where acceptance of the re-invite to the fax-relay protocol initiates transfer to the fax-relay protocol connection.

34. The method of claim 30, further comprising sending the re-invite to the fax-relay protocol based at least in part upon the state of the state machine, the re-invite to the fax-relay protocol requesting transfer from the pass-through connection to the fax-relay protocol connection.

35. A method, comprising:
monitoring a fax media stream session across a G.711 pass-through connection, the fax media stream session including a plurality of packets communicated across the G.711 pass-through connection;
detecting a V.21 frame in a packet communicated via the fax media stream session, where the V.21 frame is not a digital command signal (DCS); and
in response to detecting the V.21 frame, providing an indicator to reset a jitter buffer associated with the G.711 pass-through connection.

36. The method of claim 35, wherein the jitter buffer is in a gateway in communication with an endpoint fax terminal.

37. The method of claim 35, wherein the jitter buffer is in a fax server.

38. A method, comprising:
monitoring a fax media stream session across a G.711 pass-through connection using a V.34 modulation scheme, the fax media stream session including a plurality of packets communicated across the G.711 pass-through connection;
detecting a high-band QAM signal termination or a low-band QAM signal termination in a packet communicated via the fax media stream session; and
in response to detecting the high-band QAM signal termination or the low-band QAM signal termination, providing an indicator to reset a jitter buffer associated with the G.711 pass-through connection.

39. The method of claim 38, further comprising clearing the indicator prior to the start of a subsequent signal.

40. The method of claim 38, wherein the jitter buffer is in a gateway in communication with an endpoint fax terminal.

41. The method of claim 38, wherein the jitter buffer is in a fax server.

42. A method, comprising:
monitoring a fax session across a G.711 media stream, the fax session including a plurality of packets communicated across the G.711 media stream;
determining that the fax session is using a V.8 specification to negotiate the fax session; and corrupting the G.711 media stream to inhibit V.8 negotiation until a call control entity has negotiated a transition to a fax-relay protocol.

43. The method of claim 42, wherein the method is independent of call control procedures implemented by an on-ramp gateway or an off-ramp gateway.

* * * * *